(12) United States Patent
Schwager et al.

(10) Patent No.: US 10,721,384 B2
(45) Date of Patent: Jul. 21, 2020

(54) CAMERA WITH RADAR SYSTEM

(71) Applicant: SONY CORPORATION, Tokyo (JP)

(72) Inventors: Andreas Schwager, Waiblingen (DE); Markus Kamm, Karlsruhe (DE); Dietmar Schill, Ludwigsburg (DE); Daniel Schneider, Stuttgart (DE)

(73) Assignee: SONY CORPORATION, Tokyo (JP)

(*) Notice: Subject to any disclaimer, the term of this patent is extended or adjusted under 35 U.S.C. 154(b) by 100 days.

(21) Appl. No.: 15/126,341

(22) PCT Filed: Mar. 25, 2015

(86) PCT No.: PCT/EP2015/056337
§ 371 (c)(1),
(2) Date: Sep. 15, 2016

(87) PCT Pub. No.: WO2015/144741
PCT Pub. Date: Oct. 1, 2015

(65) Prior Publication Data
US 2017/0085771 A1 Mar. 23, 2017

(30) Foreign Application Priority Data
Mar. 27, 2014 (EP) .................................. 14161999

(51) Int. Cl.
*H04N 5/232* (2006.01)
*H04N 13/282* (2018.01)
(Continued)

(52) U.S. Cl.
CPC ....... *H04N 5/23203* (2013.01); *G01S 13/867* (2013.01); *H04N 5/232* (2013.01);
(Continued)

(58) Field of Classification Search
CPC .......... H04N 5/23203; H04N 5/23212; H04N 5/23296; H04N 13/0282; H04N 5/2352; H04N 5/232; G01S 13/867
See application file for complete search history.

(56) References Cited

U.S. PATENT DOCUMENTS

2003/0122930 A1* 7/2003 Schofield .................. B60R 1/00
348/148
2003/0146986 A1* 8/2003 Calderwood .......... H04N 5/235
348/240.1
(Continued)

FOREIGN PATENT DOCUMENTS

JP 2014-6188 A 1/2014
KR 10-2011-0082734 A 7/2011

OTHER PUBLICATIONS

U.S. Appl. No. 15/111,106, filed Jul. 12, 2016, Andreas Schwager, et al.
(Continued)

*Primary Examiner* — Tat C Chio
(74) *Attorney, Agent, or Firm* — Xsensus LLP

(57) ABSTRACT

A camera includes an optical system configured to record images based on light entering the optical system from an optical field of view, a radar system configured to obtain radar information of targets within a radar field of view that is overlapping with the optical field of view, the radar information including one or more of a distance information indicating the distance of targets with respect to the camera, a speed information indicating the speed of targets with respect to the camera and dimension information indicating a dimension of targets, and a control unit configured to control at least one parameter of the optical system based on the obtained radar information.

20 Claims, 13 Drawing Sheets

(51) Int. Cl.
*G01S 13/86* (2006.01)
*H04N 5/235* (2006.01)
(52) U.S. Cl.
CPC ....... *H04N 5/2352* (2013.01); *H04N 5/23212* (2013.01); *H04N 5/23296* (2013.01); *H04N 13/282* (2018.05)

(56) References Cited

U.S. PATENT DOCUMENTS

| | | | | |
|---|---|---|---|---|
| 2007/0242944 | A1* | 10/2007 | Mizusawa | B60R 1/00 396/234 |
| 2008/0278366 | A1* | 11/2008 | Behrens | G01S 7/41 342/109 |
| 2009/0128647 | A1* | 5/2009 | Fahn | G01S 3/7865 348/221.1 |
| 2009/0136141 | A1* | 5/2009 | Badawy | G06F 17/30781 382/225 |
| 2009/0141138 | A1* | 6/2009 | DeAngelis | H04N 7/181 348/220.1 |
| 2010/0156632 | A1* | 6/2010 | Hyland | G08B 25/08 340/540 |
| 2011/0193739 | A1* | 8/2011 | Strauch | G01S 7/006 342/146 |
| 2011/0286632 | A1 | 11/2011 | Tuxen et al. | |
| 2013/0278755 | A1* | 10/2013 | Starns | G01C 11/02 348/135 |
| 2014/0118179 | A1* | 5/2014 | Alland | G01S 7/025 342/22 |
| 2014/0205139 | A1* | 7/2014 | Kriel | G06K 9/00805 382/103 |
| 2014/0277940 | A1* | 9/2014 | VanVuuren | B60R 1/00 701/36 |
| 2014/0336848 | A1* | 11/2014 | Saund | G08G 1/054 701/3 |

OTHER PUBLICATIONS

International Search Report dated Apr. 30, 2015 in PCT/EP2015/056337 filed Mar. 25, 2015.
Written Opinion dated Apr. 30, 2015 in PCT/EP2015/056337 filed Mar. 25, 2015.
Martin Braun et al., "A USRP-based Testbed for OFDM-based Radar and Communication Systems", Proceedings of 22nd Virginia Tech Symposium on Wireless Communications, Jun. 2012, 6 pages.
Christian Sturm, "Shared process or Joint Activity of Radar Sensors and radio communication with OFDM signals", PhD thesis, KIT Scientific Publishing, 2012, vol. 66, 205 pages (with English abstract).

* cited by examiner

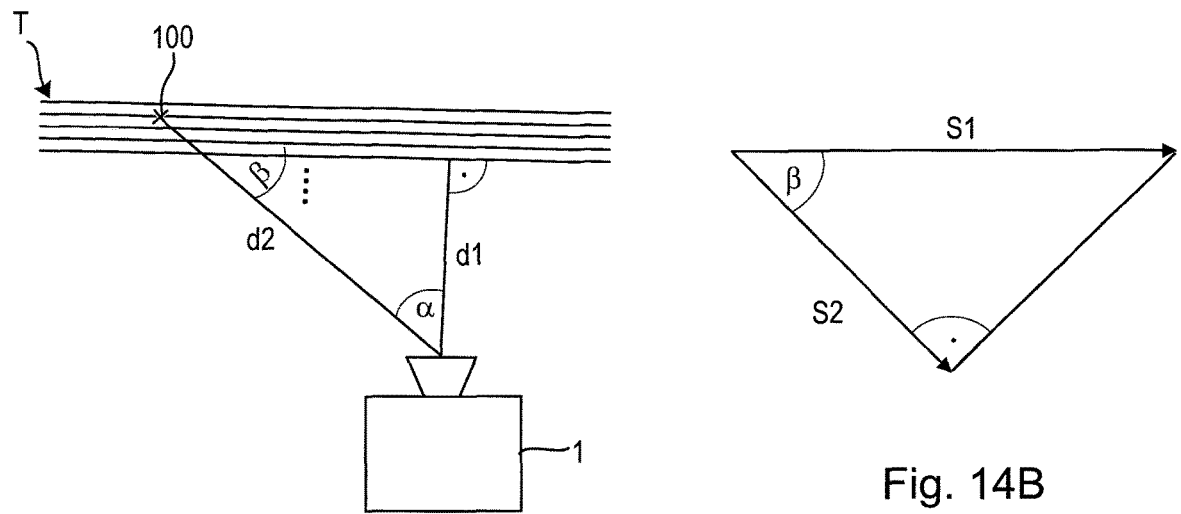
Fig. 14A
Fig. 14B
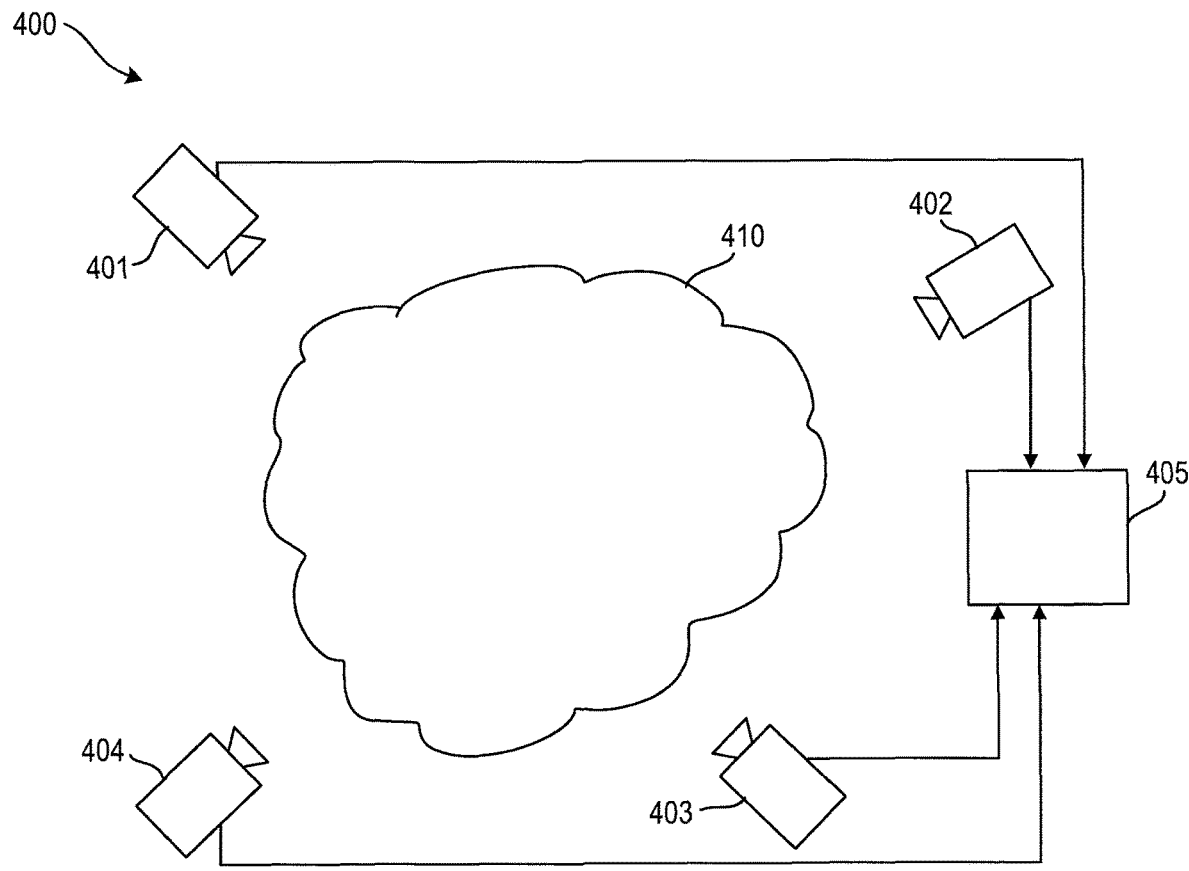
Fig. 15

CAMERA WITH RADAR SYSTEM

CROSS-REFERENCE TO RELATED APPLICATIONS

The present application is based on PCT filing PCT/EP2015/056337 filed Mar. 25, 2015, and claims priority to European Patent Application EP14161999.9 filed by the European Patent Office on 27 Mar. 2014, the entire contents of each of which being incorporated herein by reference.

BACKGROUND

Field of the Disclosure

The present disclosure relates to a camera, to a camera system comprising a plurality of cameras and to a radar system for use in a camera.

Description of Related Art

Today's autofocus (AF) systems are mostly passive systems. The passive systems can be divided into two subcategories, the contrast AF and the phase AF. The contrast AF relies on contrast maximization or edge sharpening of one or multiple objects in the scene. From the contrast or sharpness measurement it cannot be determined whether the focus position is too close or too far. Such a focus strategy is usually slow and requires a closed loop transfer function for the precise adjustment of the lens. The phase AF measures the disparity between two (or more) images of the object, which were captured through different parts of the lens aperture. The object distance is calculated from the disparity value by triangulation. The phase AF is faster than the contrast AF but still needs a few iteration steps for the precise adjustment of the lens. Both passive AF systems require a sufficient brightness of the scene. In that case an assist lamp is used to illuminate dark scenes, but this limits the useable depth range to a few meters only.

There are also active AF systems. One active AF system relies on infrared (IR) illuminations and uses an assist lamp usually interfering people's mood before a snapshot. The scene is illuminated with IR light, which is scattered back from the object. The object distance is measured from the time delay of the back-scattered light. Another active AF system uses simple or conventional ultrasonic signals to measure the distance to the object. Such an ultrasonic system is, however, not working when capturing objects through glass panels. Both active AF systems have a limited depth range of only a few meters and cannot measure the speed of objects.

Further, there are AI (artificial intelligence) servo focus systems on the market, e.g. used in the Sony α99 camera. Such AI servo focus systems generally use algorithms that constantly predict where a subject is about to be based on its speed and acceleration data from the autofocus sensor. AI servo is known also as "continuous focus" (AF-C). In focus tracking, it is used to track a subject as it moves around the frame, or towards and away from the camera. When in use, the lens will constantly maintain its focus on the subject, for which purpose it is commonly used for sports and action photography. The AI servo approach is a higher layer calculation of the speed and movements measurements. The artificial intelligence algorithms require lots of processing power raising the price and battery consumption of the camera system. Additionally, this processing causes delay when recording a snapshot. Furthermore, such processing has to be aware of the history of the scene to follow and predict the movement of the object. Sudden snapshots focusing to the objects with highest velocity are impossible.

Other focusing systems do not measure the distance to the object. They rely on sharpening the edges or optimizing the contrast in the picture content. The user touches the location on the screen that he likes to sharpen. The lens wobbles its dynamic range where an algorithm monitors at which lens position the sharpest image is achieved. Finally this lens position is selected. This method is time consuming and too slow for sports photographing, e.g. for focusing on a tennis racket when hitting the ball.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a camera, a camera system and a radar system that enable new applications of the camera.

According to an aspect there is provided a camera comprising an optical system configured to record images based on light entering the optical system from an optical field of view, a radar system configured to obtain radar information of targets within a radar field of view that is overlapping with said optical field of view, said radar information including one or more of a distance information indicating the distance of targets with respect to the camera, a speed information indicating the speed of targets with respect to the camera and dimension information indicating a dimension of targets, and a control unit configured to control at least one parameter of said optical system based on the obtained radar information.

According to a further aspect there is provided a camera system comprising a plurality of cameras as claimed in claim 1 located at different angular positions with respect to a scene, a processor configured to process image information and radar information obtained from said plurality of cameras to generate a three-dimensional data set of the scene.

According to a further aspect there is provided a radar system for use in a camera as disclosed herein comprising a radar unit configured to obtain radar information of targets within a radar field of view, said radar information including one or more of a distance information indicating the distance of targets with respect to the radar system, a speed information indicating the speed of targets with respect to the radar system and dimension information indicating a dimension of targets, a hot shoe interface configured to mount the radar system to a hot shoe of the camera and to dismount the radar system from the hot shoe of the camera and a radar interface configured to enable communication between the radar system and the camera.

Preferred embodiments are defined in the dependent claims. It shall be understood that the disclosed camera system and the disclosed radar system have similar and/or identical preferred embodiments as the claimed camera and as defined in the dependent claims.

One of the aspects of the disclosure is to use a radar system for obtaining radar information including one or more of a distance information, a speed information and dimension information of one or more targets (also called objects) within a radar field of view. This radar information (or part thereof) is then used for controlling one or more parameters of the camera's optical system (also referred to as "camera settings" hereinafter), for instance to focus on a target based on a selected distance and/or a selected speed, for instance to focus on the fastest target present in the scene. The use of the radar information thus allows a plurality of new applications and generally enables a fast, precise and simple control the optical system of the camera.

For instance, in an embodiment an OFDM (Orthogonal Frequency-Division Multiplexing) radar is used in a still picture or movie camera, which is able to focus the lenses on the target in the scene having the highest velocity. Frequently, in sports photographs the target with highest velocity is the most interesting one and desired to be in the focus. Utilizing an OFDM radar signal a Doppler-Range matrix can be calculated. Such a matrix enables to identify which target or object has the highest speed, e.g. in direction to the radar. Thereafter, its distance to the radar is determined from the Doppler-Range matrix, which distance is then used to focus the objective/lens onto said distance and, thus, onto the fastest target at said distance. By use of the OFDM radar the speed and distance information is available after calculating a two-dimensional Fourier transformation on the radar sensor data.

While an OFDM radar allows to easily obtain the desired radar information of the object(s), other radars may be used in the context of the present disclosure as well to derive the desired radar information about the object (s). For instance, an FMCW radar, a pulsed radar, or a radar using any correlation based receiver where a PeCAN or any other sequence is transmitted having good correlation properties may be used.

The proposed camera is able to provide and use additional information that is not available in known cameras or systems. Desired or new applications can thus be implemented in a rather inexpensive and comfortable manner enabling the realization of a consumer friendly and consumer affordable camera. Further, the proposed camera is working also in dark scenes and at large distances.

Today's high end still picture cameras still have a moving mirror implemented to mirror the light to the AF sensor before the picture is captured. Using a radar based autofocus, as proposed according to an embodiment of the present disclosure, the moving mirror is no more needed.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 14 shows diagrams illustrating the measurement of the speed of an object, and FIG. 15 shows a schematic diagram of a camera system according to the present disclosure.

DETAILED DESCRIPTION OF THE EMBODIMENTS

Figure 1:
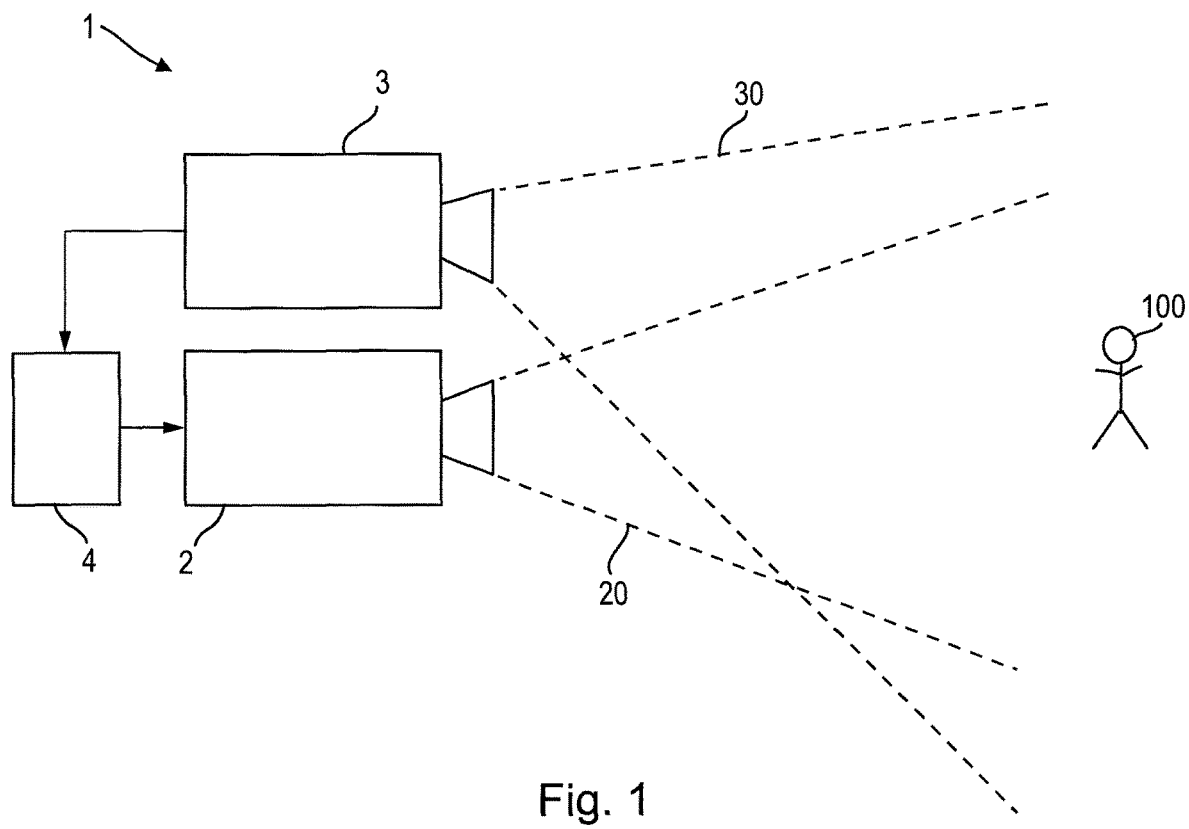
FIG. 1 shows a schematic diagram of the general layout of a camera according to the present disclosure.

Referring now to the drawings, wherein like reference numerals designate identical or corresponding parts throughout the several views, FIG. 1 shows a schematic diagram of the general layout of a camera 1 according to the present disclosure, which may be a still picture camera or a video camera. The camera 1 generally comprises an optical system 2 that records images based on light entering the optical system 2 from an optical field of view 20. The camera 1 further comprises a radar system 3 that obtains radar information of targets 100 within a radar field of view 30 that is overlapping with said optical field of view 20. Said radar information includes one or more of a distance information indicating the distance of targets with respect to the camera, a speed information indicating the speed of targets with respect to the camera and dimension information indicating a dimension of targets. Finally, a control unit 4 is provided that controls at least one parameter of said optical system 2 based on the obtained radar information. Controllable parameters of the optical system 2 may include the focus, the focal length, the optical aperture, the shutter timing, the luminance sensitivity and/or the flashlight intensity as will be explained in more detail below.

Preferably, the radar field of view 30 substantially overlaps, coincides or is even larger than the optical field of view 20, i.e. completely covers the optical field of view 20. The radar field of view 30 may be static, while the optical field of view may generally be variable in case of using zoom optics. Hence, the size and orientation of the radar field of view 30 may be adapted to correspond to the size and orientation of the maximally possible optical field of view 20, or the size and orientation of the radar field of view 30 may be made adaptive so that it can "follow" the size and orientation of the optical field of view. In case of a video camera the frame rate might also be controlled.

It shall be noted that the control unit 4 may also be part of the optical system 2 and/or the radar system 3 and may be implemented in hard- and/or software. Further, the radar system 3 and, optionally, the control unit 4 may be arranged within or at the same housing as the optical system. Alternatively, the radar system 3 and, optionally, the control unit 4 may be available as a separate (exchangeable) unit, such as an additional add-on unit for later improvement of the camera enabling additional applications of the camera and/or improving its performance.

Usually, in sports photographing the scene or the target providing fastest velocity is the most interesting one. Due to the high motion it is difficult for the photographer to focus on the fastest target. Frequently, at sports photographing multiple targets in individual distances are visible. Known autofocus systems, however, often focus on another target. For instance, in soccer the photographer is located behind the goal. Goal net, goal post, goalkeeper and fullback players are located in the foreground, and the arena, spectators and other players are located in the background. The forward player is going to kick the ball. The leg of the player is expected to be the target with fastest velocity towards the photographer. This target shall be focused by the camera out of the multiple targets in the scene. Further applications may be to setup a self-timer which triggers at any motion higher than a given speed threshold or to trigger on speed in a particular direction, in particular towards or away from the camera.

Such OFDM radar systems output after a two-dimensional Fourier Transform (2D-FFT) (usually implemented using a Fast Fourier Transformation) a two-dimensional matrix (also called Range-Doppler-Matrix) containing distance and speed information of targets where for each target within the radar field of view the distance and speed information is provided. A detailed description of this process and the formation of such a matrix can be found in the above mentioned documents, in particular in section II of the paper of Martin Braun et al. (said matrix being referred to as periodogram there) and section 2.5 of the PhD Thesis of Christian Sturm, which descriptions are herein incorporated by reference.

Figure 2B:
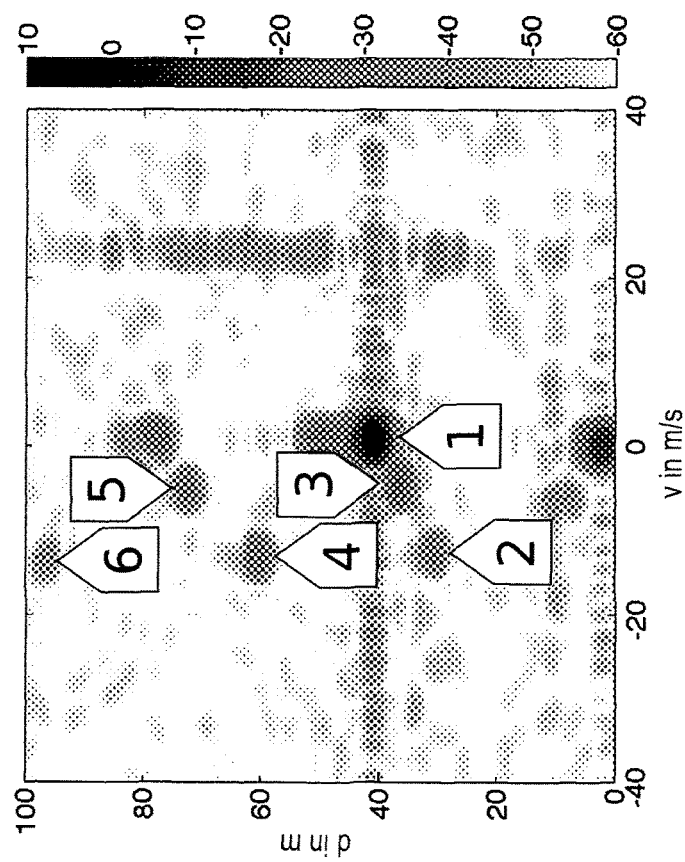
FIG. 2 shows a photograph of a scene and a corresponding Doppler-Range matrix.
Figure 2A:
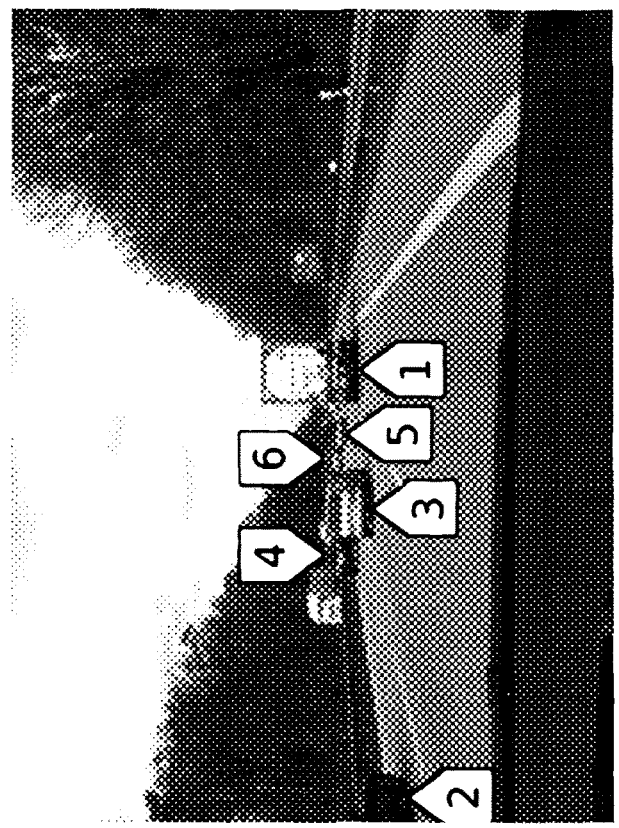

FIG. 2A shows a scene photographed on a German highway, where three cars on the left lane pass with highest speed two other cars on the middle lane passing a truck on the right lane. FIG. 2B shows the corresponding radar image recoded using an OFDM radar system. This radar image provides the relation between Doppler (relative speed v with respect to the OFDM radar system) and range (distance d with respect to the OFDM radar system) of each target in the scene. Cars ("targets") identified in the picture (labeled by "1" to "6") are also labeled in the radar image. FIGS. 2A and 2B are taken from the PhD Thesis of Christian Sturm (FIGS. 4.8 and 4.9).

Figure 3:
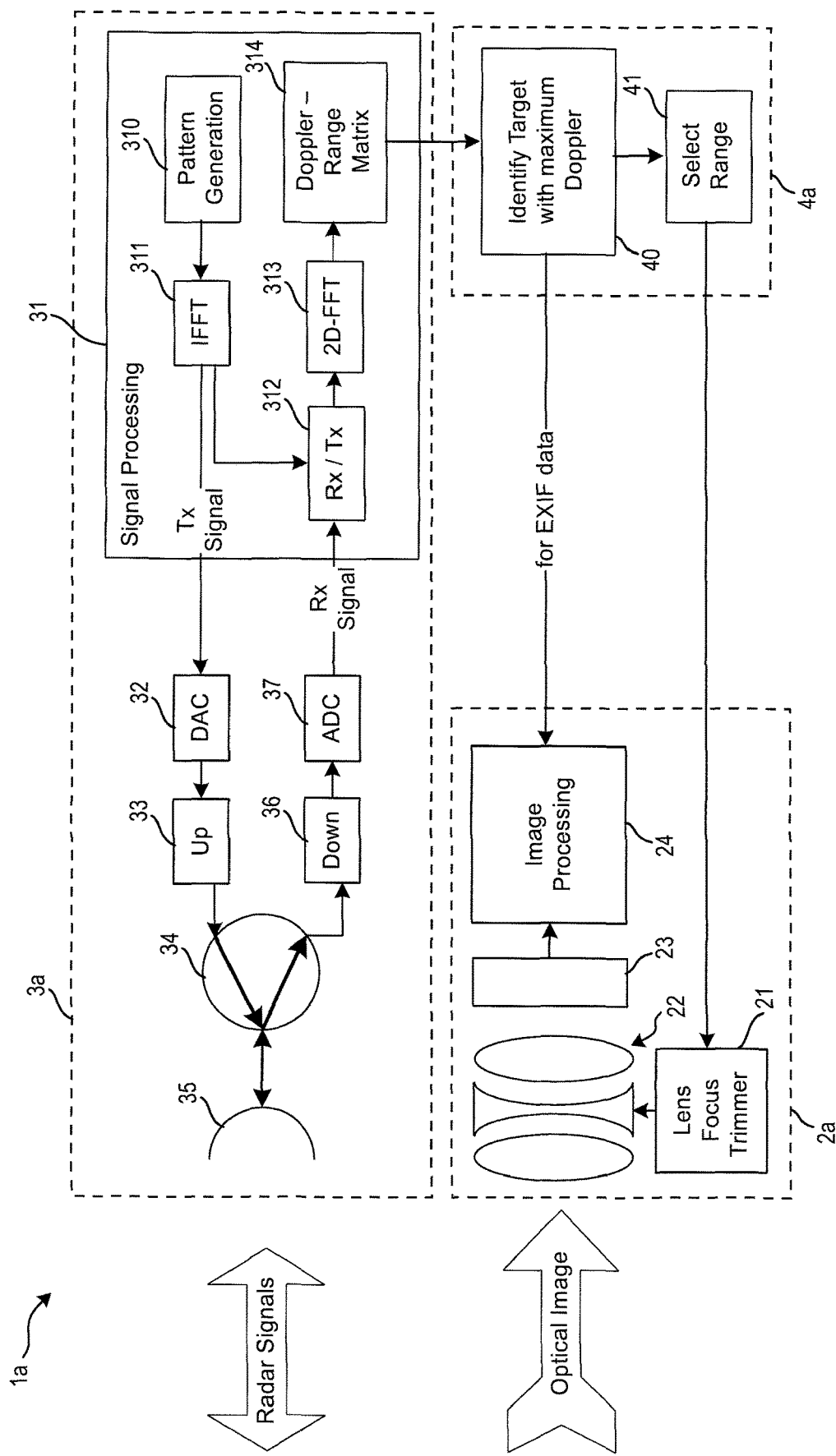
FIG. 3 shows a schematic diagram of a first embodiment of a camera according to the present disclosure.
Figure 4:
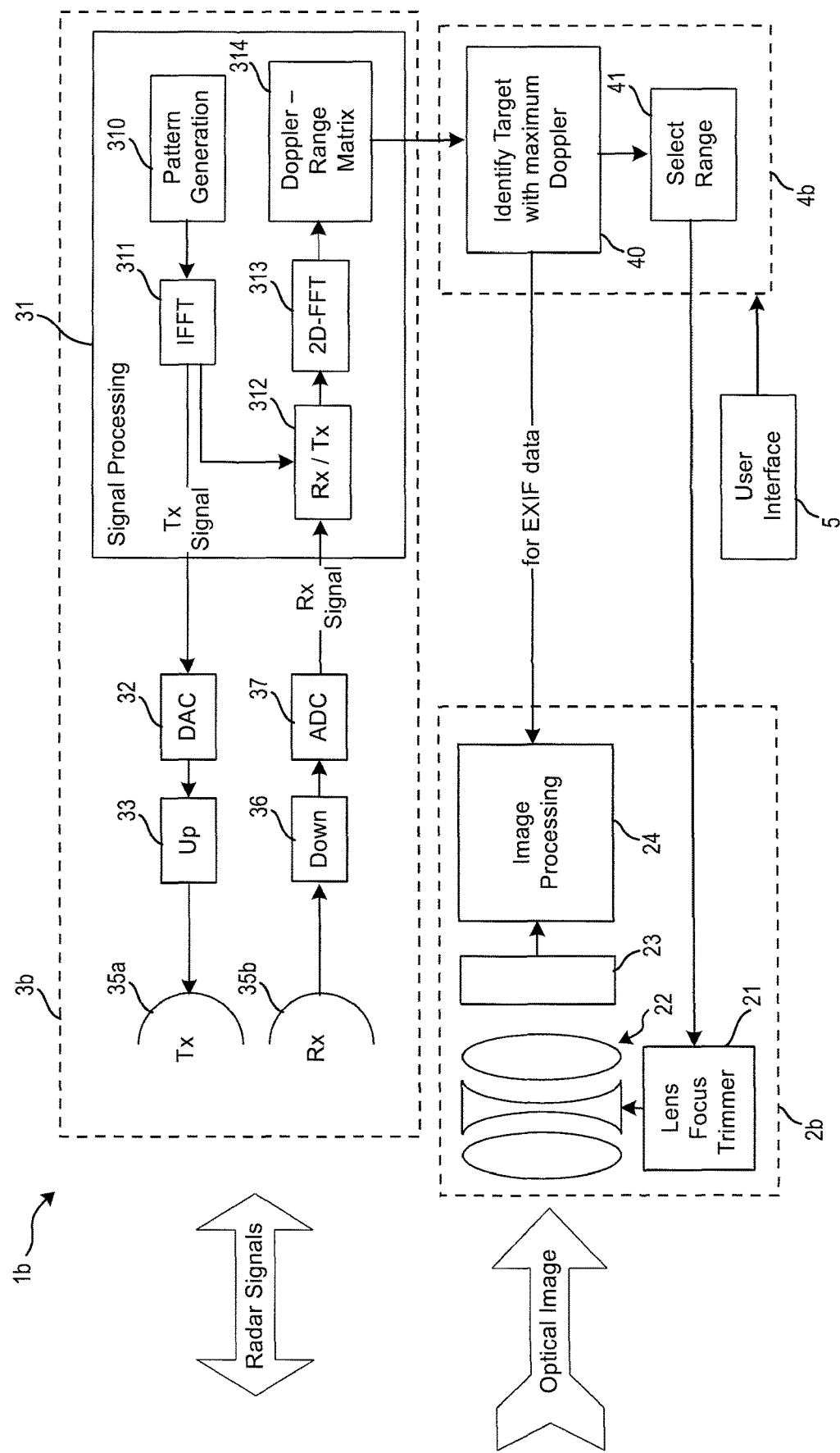
FIG. 4 shows a schematic diagram of a second embodiment of a camera according to the present disclosure.

FIGS. 3 and 4 show schematic diagrams of a first and second, more detailed embodiments of a camera 1a, 1b according to the present disclosure. These embodiments will be explained with reference to the application that the fastest moving target shall be focused on by the camera 1a, 1b. It shall, however, be noted that the same cameras can be used for other applications and in other modes, as will be explained further down below. Further, the radar system is an OFDM radar system, while other radar systems may be used as well.

The OFMD radar system 3a comprises an OFDM signal procession unit 31 which may be implemented in an integrated circuit (IC). It includes a pattern generator 310 to generate the information or data to be transmitted. There are various additional applications possible (as explained below) where the transmit data could additionally be utilized. Generally, for obtaining the desired distance and speed information random data may be used for transmission by the OFDM radar system. The data are processed by an IFFT unit 311 to generate the OFDM signals to be transmitted as Tx signal. A digital to analog converter (DAC) 32 forwards the OFDM signal to an up-converter 33 shifting the signal into the high frequency range (e.g. to 24 GHz or 77 GHz). The directional bridge 34 guides the transmit signals to the antenna 35 where the received signals are guided to the frequency down converter 36 and the analog to digital converter (ADC) 37 creating the digital receive signal (Rx signal).

In this embodiment of the camera 1a shown in FIG. 3 one bidirectional antenna 35 is used for transmitting and receiving the radar signals. However, the autofocus application proposed by the present disclosure may also be implemented using two antennas 35a, 35b, one (35a) for transmitting and the other one (35b) for receiving as providing in the embodiment of the camera 1b shown in FIG. 4 comprising another embodiment of the radar system 3b. In this dual antenna approach the directional bridge 34 is not needed.

Subsequently, in the OFDM signal processing unit 31 the Rx signal is divided in a divider 312 by the Tx signal resulting in a channel estimation information of each OFDM symbol. This information is collected in a time-frequency matrix where the OFDM symbols are aligned in time and frequency domain. The 2D-FFT unit 313 calculates the Doppler-Range matrix. In an analysis unit 134 the Doppler information is derived out of the FFT over the time axis and the range information is derived out of the FFT over the frequency axis. More details about how to obtain such a matrix including distance and speed information of targets within a scene can be found in the above mentioned theses and paper.

Figure 5:
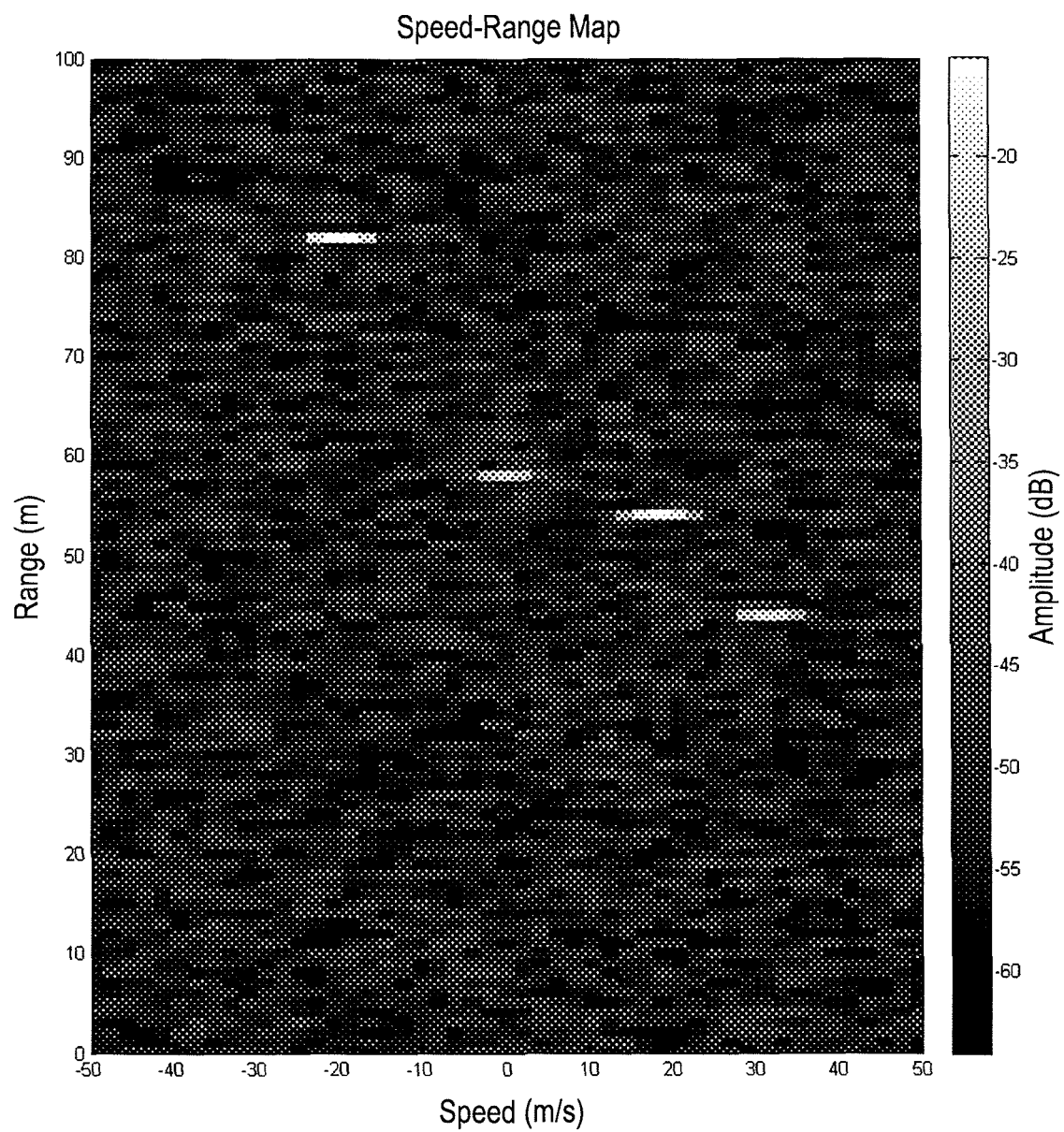
FIG. 5 shows a graphic illustration of an example of a Doppler-Range matrix.

FIG. 5 shows an example of a Speed (or Doppler)-Range matrix (or map) including four targets. The closest target is located at a distance of 45 m having a speed of +30 m/s relative to the radar system. The second closest target is found at 54 m distance with the speed of 20 m/s. Next target is located 58 m away from the radar and has the identical speed than the radar platform. The most remote target is at a distance of 83 m with the speed of −20 m/s relative to the radar itself.

The Doppler-Range matrix provides a unique relationship of speed (Doppler) and distance (range) for each target in the radared scene, i.e. in the radar field of view. A maximum detection unit 40 within the control unit 4a identifies the target providing highest velocity. The range of this target is selected in a selection unit 41. The range information is forwarded to the lens focus trimmer 21, representing the focusing unit, to adjust the focus to the distance of the desired target, i.e. to control the camera optics 22 to focus on the selected distance.

As a next step the picture of the optical field of view is recorded on the image sensor (e.g. CMOS (Complementary Metal Oxide Semiconductor) sensor or CCD (Charge Coupled Device) sensor) 23 and further processed by the image processing unit 24. The speed of the target (and/or the distance or other information obtained by the radar system) may further be stored along with the recorded image, e.g. in the images exchangeable image file format (EXIF) data. Further, speed and range of all other identified targets, derivable from the Doppler-Range matrix, may also be saved in the EXIF data. Information obtained from the Doppler-Range matrix or the complete Doppler-Range matrix might also be stored at any other memory location attached to the image or photograph.

In the case of a 'Macro' image (compared to a long range image) the properties of the radar system can be adapted. For instance, in order to radar short distances the radar observation time or signal repetition time of the radar signals may be shortened to avoid the reflections to arrive before transmission is ended. If the scene of interest is in a long distance to the camera the radar observation time or signal repetition time may be expanded. Shortening the radar observation time can be done by using shorter OFDM symbols with less carriers or sending a reduced number of OFDM symbols. Of course, expanding the observation time can be done with enlarging the number of carriers or sending longer OFDM symbols.

In addition the photographer may adjust the resolution of the speed to be detected by the camera. A fine speed resolution is achieved with a long observation time. A low speed resolution, but a short measurement time is achieved with a short radar observation time. For instance, scenes including objects with high speed are not captured in close distances and 'macro' mode. Photographing in 'macro' mode, as one potential focusing mode, requires high velocity resolution. When the camera is set to 'macro' mode the observation time of the radar may be enhanced.

In the case of a Frequency Modulated Continuous Wave (FMCW) radar the timings of the ramps might be adjusted to enlarge or shorten the signal time. In the case of a pulse based radar, the pulse repetition timing might be adapted.

Further applications where the generated data pattern could be used. For instance, transmitted OFDM data payload might be utilized to transmit a sequence identifying the camera. In the case of multiple simultaneous photo shots from multiple cameras the device transmitting the radar signal can be identified. This avoids coexistence problems with multiple cameras. Further, data may be transmitted for communication from one camera to another camera system. Such a communication may be used e.g. to synchronize the cameras so that e.g. flashlights do not interfere among multiple cameras.

The known approach of focusing on the fastest object using the artificial intelligence algorithm, which has been briefly explained above in the background section, may be combined with the proposed radar approach. The radar (e.g. an OFDM radar) is particularly able to measure the speed (Doppler) in a direction to or away from the radar system. An autofocus based on artificial intelligence may further detect targets moving in normal direction e.g. a formula 1 race car passing the spectators' seats in parallel to the tribune. A beam-switching radar also identifies the speed of objects in normal direction to the radar view, in particular by monitoring the locations of the object with respect to the radar over time. Combining both autofocus approaches will enhance the precision of the distance measures.

In case there are several targets having the selected (e.g. maximum) speed the camera may focus and/or set optimal focus factor and/or further camera settings (as also explained below in more detail) on the target providing the strongest reflected signal level. This results in that either the target of the larger size, i.e. the dominant object in the scene, or the target closer to the camera is focused. Generally, a precise focus is more important at close targets than at targets in a wide distance.

In the above explained embodiments the fastest target (relative to the camera or absolute) shall be focused and/or optimal focus factor and/or further camera settings shall be setup. In other embodiments, another speed, e.g. the slowest (e.g. stationary) target (relative to the camera or absolute), or a target having the same speed as the camera (i.e. a target that has a relative speed of zero with respect to the camera) may be focused. In still other embodiments a distance (or distance range) may be selected in advance, at which a target shall be focused. This may be useful if e.g. the only standing person in a moving crowd of people shall be focused.

There are several possibilities: Either the camera is moving (e.g. mounted on a car, bicycle, boat, train, plane, any moving platform, etc.) or the camera is mounted fix (e.g. on a tripod). The camera might identify its own movement by interpretation of the radar image or any secondary information like acceleration sensors, tachometer of car, satellite positioning (GPS, Glonass, etc.) information, etc. The camera might identify its own speed and the speed of other objects in the scene. Further, the camera might identify objects with fastest absolute speed and with fastest relative speed towards the camera.

If camera is mounted fixed, the focus might be selected on the fastest object in the view towards the camera or the fastest object in the view away from the camera.

If the camera is moving, the focus (and/or other camera settings) might be selected on the object having the fastest absolute speed towards the camera, the object having the fastest absolute speed away from the camera, the object having the fastest relative speed to the camera towards the camera, the object having the fastest relative speed to the camera away from the camera, the object having the same speed as the camera, etc.

If released (or triggered), the camera might record multiple images with individual focus (and/or other camera settings) on all of the scenarios described above. The user might select the image satisfying his interest and delete the others. The post processing of the camera might calculate one sharp image of the full scenery out of the multiple images taken (where on each only a part of the scenery is sharp).

Thus, in an embodiment the control unit is configured to select a target within the radar field of view based on a selected speed, to derive the distance of the selected target from the distance and speed information obtained by the radar system and to control the focusing unit to focus said optical system on a target within the optical field of view having the selected speed and the derived distance. Other units like the shutter timing, image sensor sensitivity, flashlight intensity, the focal length, the optical aperture, the camera's position on a rotary tripod, etc. might also be controlled as will be explained below. In another embodiment the control unit is configured to select a target within the radar field of view based on a selected distance, to derive the speed of the selected target from the distance and speed information obtained by the radar system and to control the focusing unit to focus said optical system on a target within the optical field of view having the selected distance and the derived speed.

In still further embodiments the control unit may be configured to control the focusing unit to focus said optical system i) on a target within the optical field of view having a speed above a selected speed threshold, ii) on the fastest target within the optical field of view or on a target having a relative speed of substantially zero with respect to the camera, or iii) on a target within the optical field of view moving into a predetermined direction, in particular towards or away from the camera.

The various focusing modes may be selected by the user at the camera, e.g. by a user interface 5 (as shown in FIG. 4), such as a knob, button, display or touchscreen showing a menu of selectable focusing modes. In other embodiments of the camera a particular focusing mode is pre-installed, such as in cameras for special applications.

Advantageously, the optical system of the disclosed camera is configured to automatically record an image once it is controlled by the control unit to focus on a target based on a selected distance and/or a selected speed. For instance, if the camera shall be focused on the fastest target in the optical field of view, once the fastest target has been identified and focused an image is automatically recorded (or at least pre-recorded) before the user actually actively starts the recording, e.g. by hitting the recording button of the camera. This avoids any loss of time since the scene, particularly the fastest target, will likely change quickly due to the fast movement of the fastest target.

Generally, the radar system has only a single antenna both for transmission and reception or one antenna for transmission and one antenna for reception, i.e. is configured as a SISO radar system. In another embodiment two or more antennas are provided, i.e. the radar system is configured as MIMO radar system.

Optionally, in addition to distance and speed information angle information (i.e. of the azimuth angle with respect to the camera) of one or more targets, e.g. of the fastest target, can be obtained in an embodiment of the radar system. This is particularly possible by use of a MIMO radar system. The angle information can e.g. be useful to determine which of the targets in an image has a particular speed and distance. For instance, if several targets are shown in an image at substantially the same distance and are all focused, the angle information can be used to determine which of the (focused) targets had a particular speed, e.g. which was the fastest target. The angle information is thus preferably also stored along with the recorded image, e.g. in the EXIF data.

Figure 6:
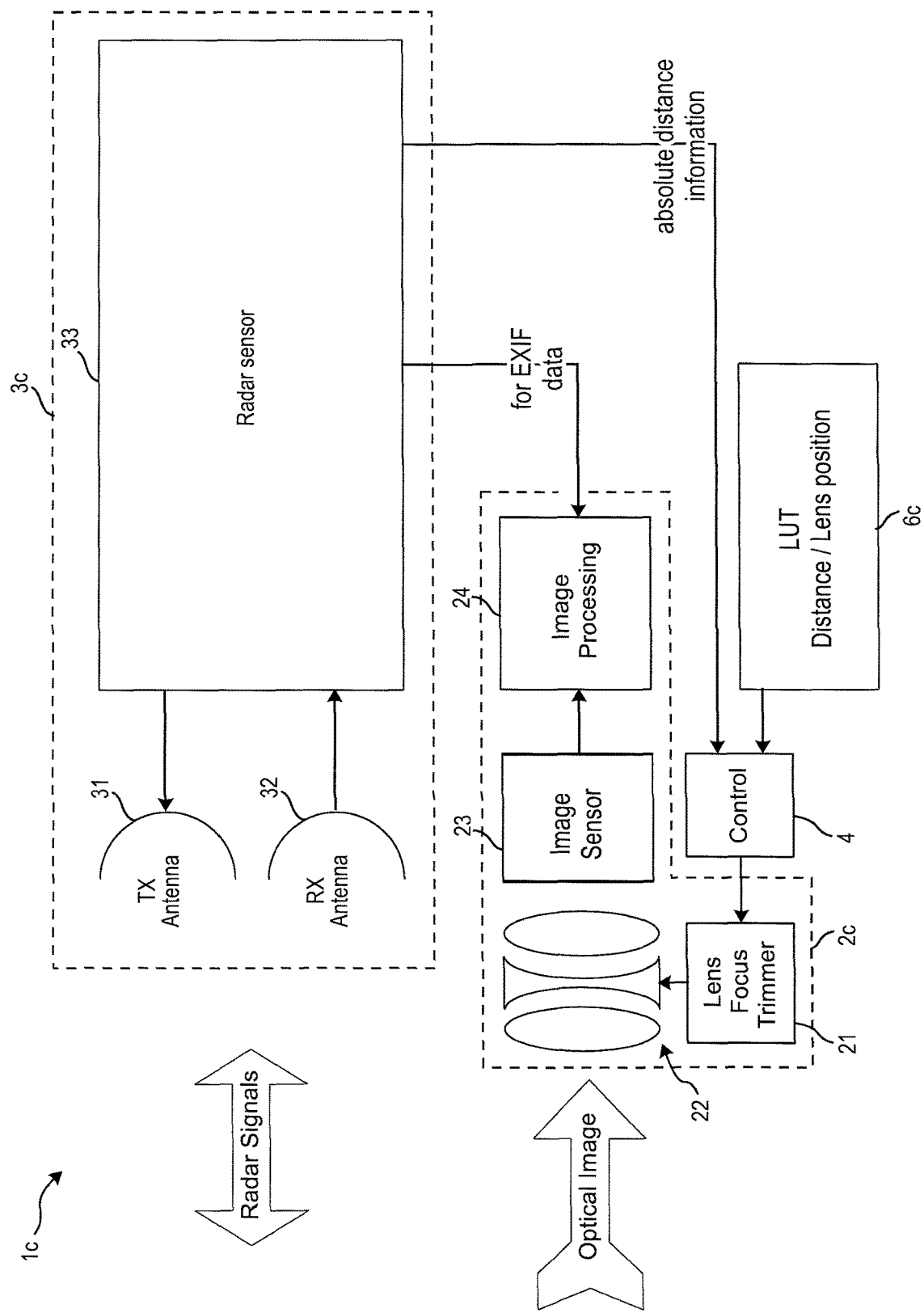
FIG. 6 shows a schematic diagram of a third embodiment of a camera according to the present disclosure.

FIG. 6 shows a schematic diagram of a third embodiment of a camera 1c according to the present disclosure. The radar system 3c comprises one (or more) transmit (Tx) antenna(s) 31, one (or more) receive (Rx) antenna(s) 32 and a radar sensor 33 (which may comprises the elements of the radar system 3a or 3b as depicted in FIGS. 3 and 4) for processing transmit and receive signals to obtain the desired radar information. The radar system 3c may generally be equipped with multiple antennas or phased array antennas collecting the direction of arrival (DoA) information from the target(s) in the scene. In still another embodiment the radar system is equipped with a single collocated antenna for transmission and reception.

The radar sensor 33 particularly records the reflected signals from the target(s). The timing of the reflected signals give the distance information to the target(s), the frequency offset or Doppler of the reflected signals give the speed information of the target(s), and the level (intensity) of the reflected signals give the dimension information including information on one or more dimensions of the target(s). In this context, "dimensions" may particularly include one or more of the size, the radar cross section (RCS), the shape and the material of the target. Targets made of metal or water (human body) usually reflect radar signals well, whereas targets made of plastic or textiles do not (or not well) reflect the radar signals. The level of the reflected signals, plus optionally information from micro reflections or micro Doppler, allow interpretations of the size of the target.

The optical system 2c particularly comprises a focusing unit 21, in this embodiment a lens focus trimmer that is configured to focus said optical system 2c, in particular its camera optics 22, such as a lens, lens arrangement and/or objective, on a target in the optical field of view 20. The focusing unit 21 and the control unit 4 can together be considered as an autofocus system. The optical system 2c further comprises an image sensor 23, e.g. a charge-coupled device (CCD) sensor or a complementary metal oxide semiconductor (CMOS) sensor, for recording the picture of the optical field of view and an image processing unit 24.

The radar information of the target, such as speed, distance, direction from the camera and/or dimension of the target may be stored along with the recorded image, e.g. in the images exchangeable image file format (EXIF) data. Further, radar information of some or all other identified targets, obtained by the radar system 3c, may also be saved in the EXIF data or any other way along with to the image.

The (absolute) distance information obtained by the radar system 3c is forwarded to the control unit 4 which controls the focusing unit 21 to adjust the focus to the distance of the desired target, i.e. to control the camera optics 22 to focus on the selected distance. In order to speed up the focus setting time a memory 6c is provided storing a look-up table (LUT). Said look-up table used for fast focusing of the optical system includes a reference between distance values (of the distance information provided by the radar system 3c) and values of the focus setting of the camera optics 22. Generally, one or more of such look-up tables may be provided each providing a reference between values of at least one parameter of said radar information and values of at least one parameter of said optical system.

For enabling a fast focusing of the optical system on a desired target in the scene, the control unit 4 thus obtains the absolute distance of the target from the radar system 3c, looks up the corresponding focus setting of the camera optics 22 in the LUT stored in the memory 6c and controls the focusing unit 21 to set the camera optics 22 to the focus setting read from the LUT.

The camera optics 22, in particular the lens of a low-cost camera with a fixed objective, may be calibrated at the time of manufacturing. The absolute distance from the camera to the image and the position of the focus-lens is stored in the look-up table in this embodiment. The information stored is the position of the focus-lens providing a sharp image at a given distance on the image sensor. In case of exchangeable camera optics (i.e. exchangeable camera objective) the distance vs. lens position LUT is preferably implemented in the exchangeable camera optics or a plurality of LUTs for various exchangeable camera optics are storing in the camera.

Alternatively, the user might calibrate the sharp locations of the focus-lens manually, after mounting the objective. Therefore the camera shall provide an 'objective-focus' calibration mode, where the user locates the camera in a selection of distances in front of a testing image. The focus position providing a sharp image at a given distance is stored in the objective or the camera, in particular in the LUT stored in the memory 6c. The finding of the sharp position may also be done automatically with a (e.g. conventional) autofocus algorithm wobbling the camera optics and maximizing the contrast of e.g. an edge in the picture content, or by manual adjustment of the user.

Figure 7:
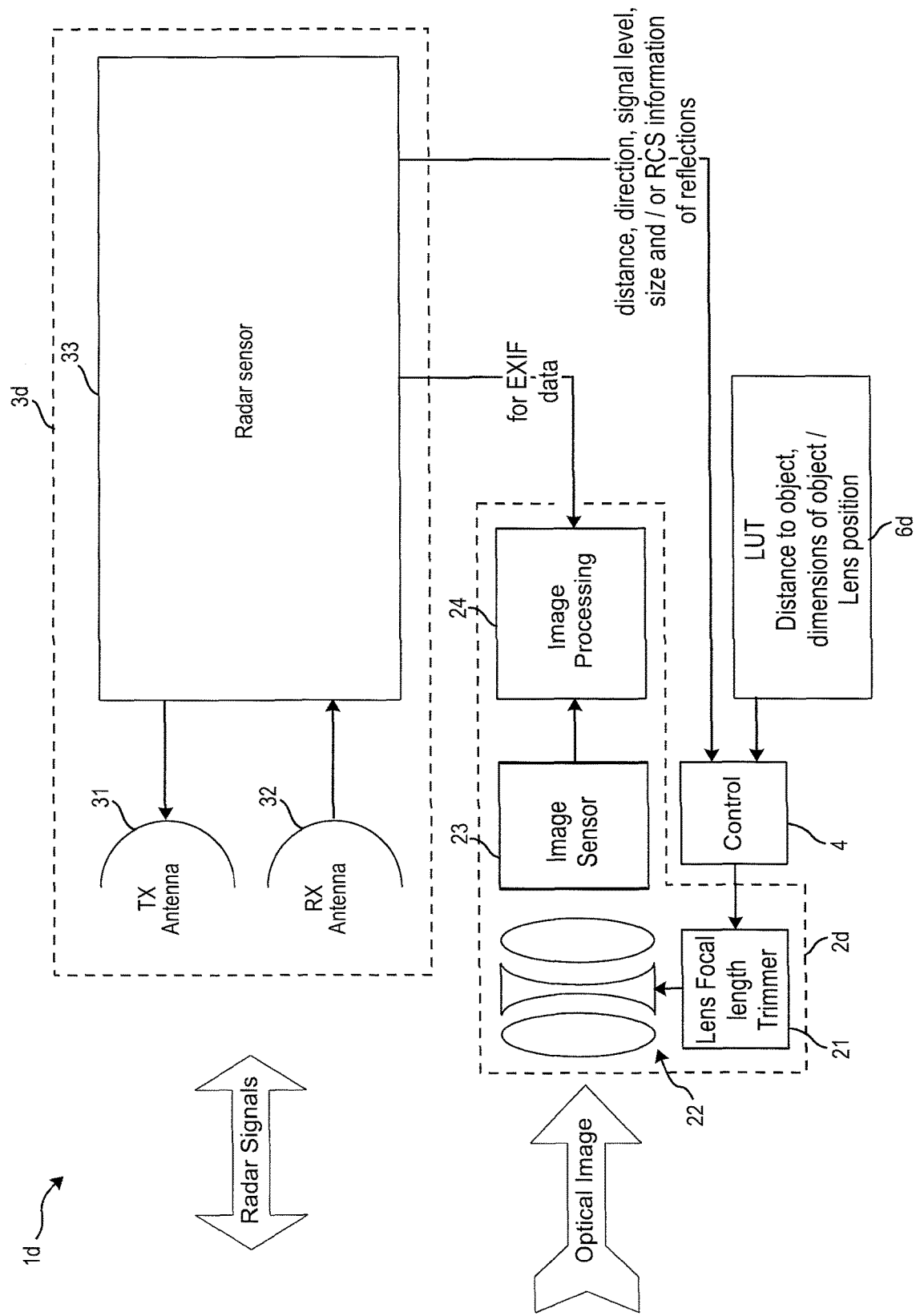
FIG. 7 shows a schematic diagram of a fourth embodiment of a camera according to the present disclosure.

FIG. 7 shows a schematic diagram of a fourth embodiment of a camera 1d according to the present disclosure. In this embodiment the optical system 2d comprises a zoom unit 25 (also called lens focal length trimmer) for changing the focal length (i.e. the zoom factor) of said optical system 2d. If the distance and the size (or dimensions) of the main target in the scene is known, the focal length or zoom factor can be adjusted to have the object of interest in optimal size on the image. Information to interpret or estimate the dimensions of the image and/or of targets in the optical field of view may also be taken from the image sensor. The control unit 4 is thus configured to control the zoom unit 25 based on the distance information and/or dimension information obtained by the radar system 3d.

For enabling a fast zooming of the optical system on a desired target in the scene, the control unit 4 thus obtains the absolute distance of the target and/or dimension information of the target from the radar system 3d, looks up the corresponding zoom setting of the camera optics 22 in the LUT stored in the memory 6d and controls the zoom unit 25 to set the camera optics 22 to the zoom setting read from the LUT.

Figure 8:
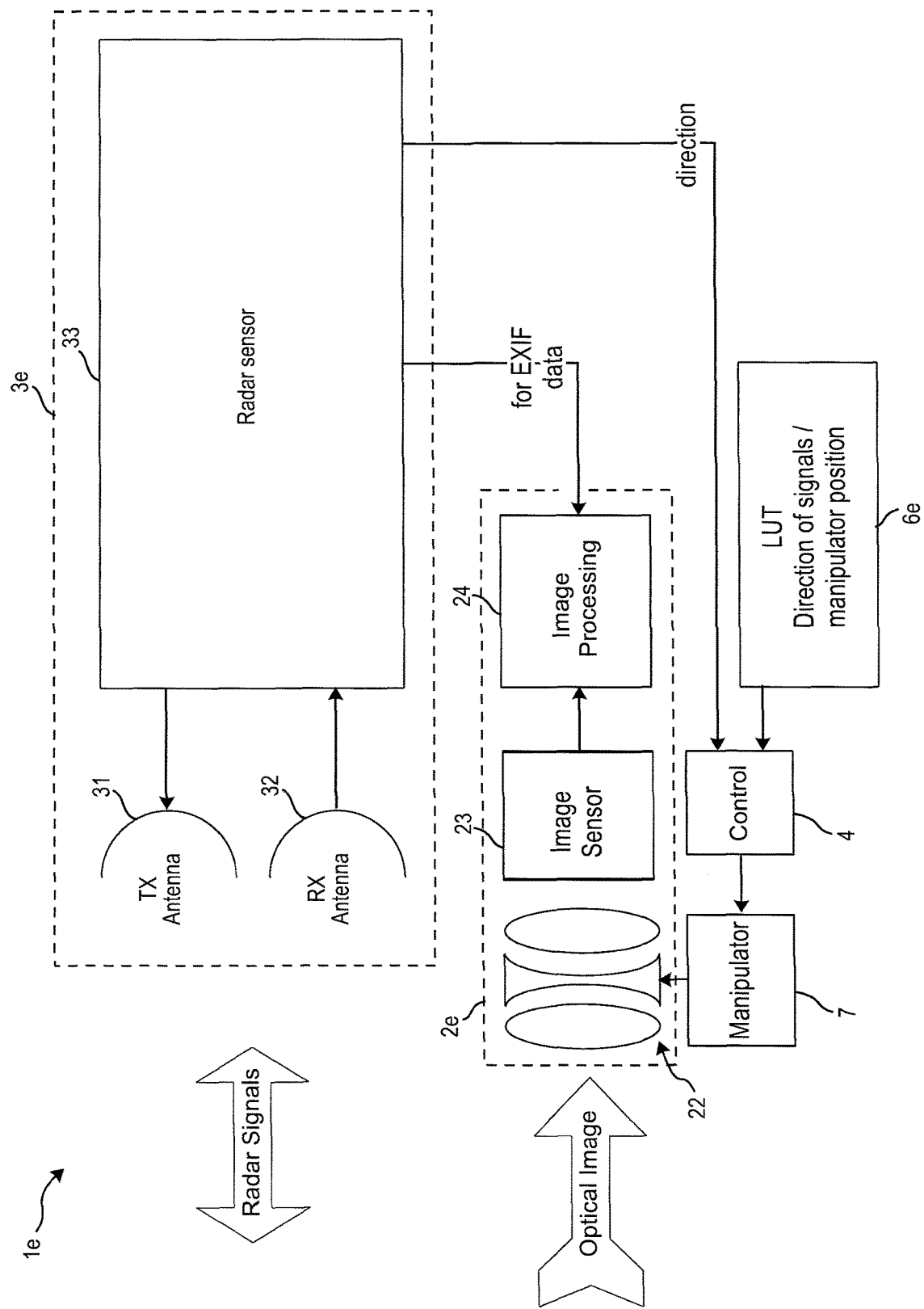
FIG. 8 shows a schematic diagram of a fifth embodiment of a camera according to the present disclosure.

FIG. 8 shows a schematic diagram of a fifth embodiment of a camera 1e according to the present disclosure. In this embodiment a camera manipulation unit 7 (as part of the camera 1e or as external unit) is provided for moving and/or tilting the camera 1e, or at least the optical system 2e of the camera 1e, with respect to a reference point, e.g. with respect to a fixation of the camera 1e, such as a rotary tripod, on which the camera 1e is mounted. This enables to have the target of interest in the center of the image. For fast control of the manipulation unit 7, which may be a motor or other actuator mounted at or within the camera or mounted at a rotary tripod, the control unit looks up the manipulator position in an LUT stored in the memory 6e based on the direction of the target obtained from the radar system 3e. For this purpose the radar system 3e is preferably equipped with multiple antennas or phased array antennas collecting the direction of arrival (DoA) information from the target(s) in the scene.

Frequently, an object does not generate only a single reflection of the radar signal, but usually multiple reflections are generated. For instance, a car radared from any angle causes reflections at the main corner of the car closest to the radar system, but the wheelhouses of the car are good dihedrals causing reflections as well. If a car is radared from a diagonal direction, the first reflection is caused by the car's corner closest to the radar, the second reflection is caused by the first wheelhouse, the third reflection is caused by the second wheelhouse. Collecting all reflections at the radar, the radar system might estimate the dimensions of the car or the length or depth of the object in the scene. If the length or deepness of the object in the scene is known, the depth of field should be adjusted to have the full object displayed sharp on the image. Therefore the optical aperture is preferably adjusted according to the radar information in an embodiment as depicted in FIG. 9.

Figure 9:
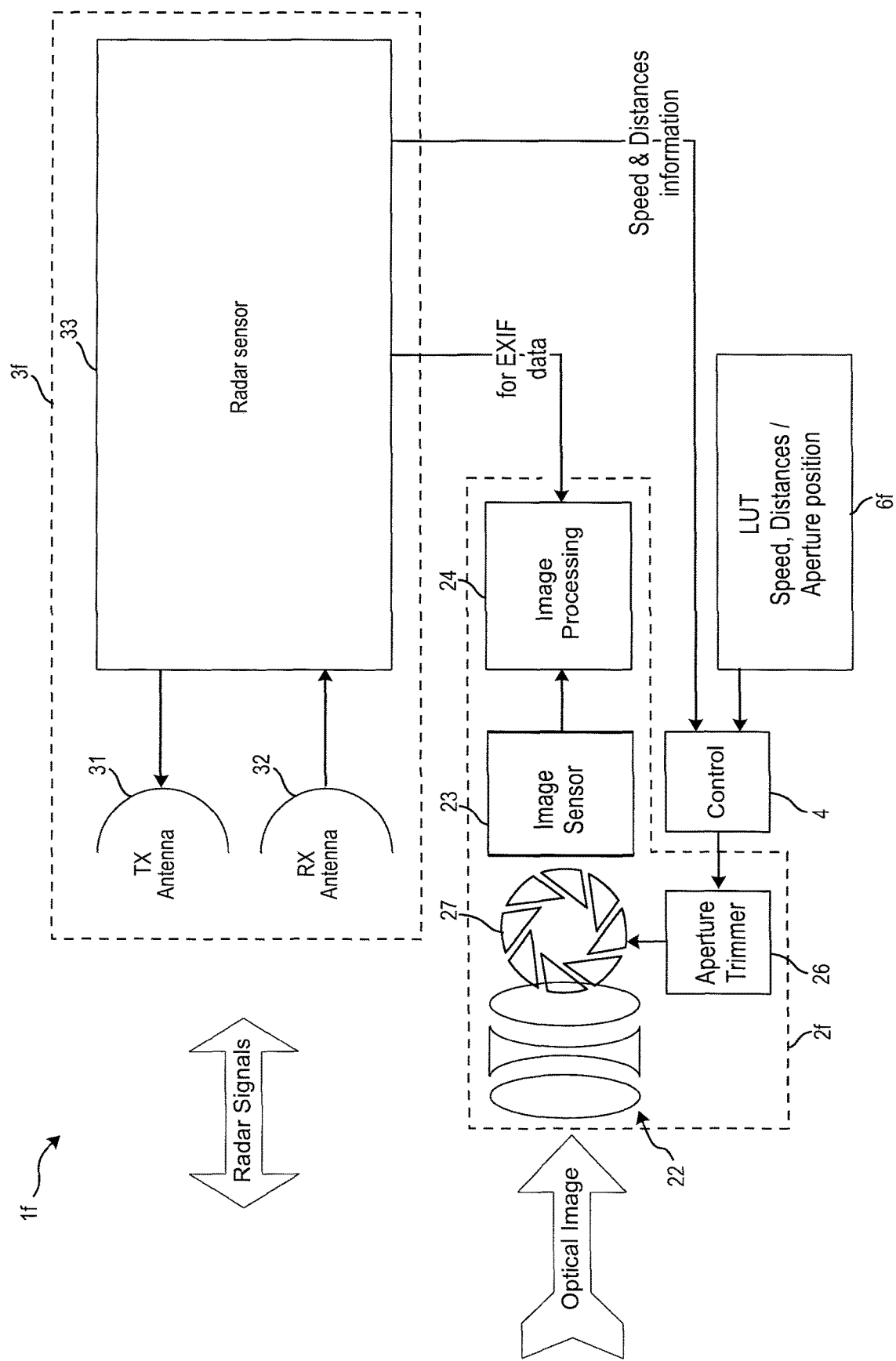
FIG. 9 shows a schematic diagram of a sixth embodiment of a camera according to the present disclosure.

FIG. 9 shows a schematic diagram of a sixth embodiment of a camera 1f according to the present disclosure. In this embodiment the optical system 1f comprises an aperture change unit 26 (also called aperture trimmer) for changing the optical aperture 27, in particular the size of the opening of the lens diaphragm, of said optical system. The control unit 4 controls the aperture change unit 26 based on the distance information and/or speed information obtained by the radar system 3E In particular, the control unit 4 looks up the aperture position in an LUT stored in the memory 6f based on the distance and/or speed of the target obtained from the radar system 3f.

Photographing fast moving targets requires a short shutter timing. To compensate the luminance requirements the aperture has to be open wider. Slow moving targets allow long shutter timings and small apertures. Hence, the speed information of the targets defines the shutter timing in order to have a sharp image. The movement of the object's image on the image sensor has to be smaller than the sensor's resolution. In this case the image has to visualize the target sharp.

Figure 10:
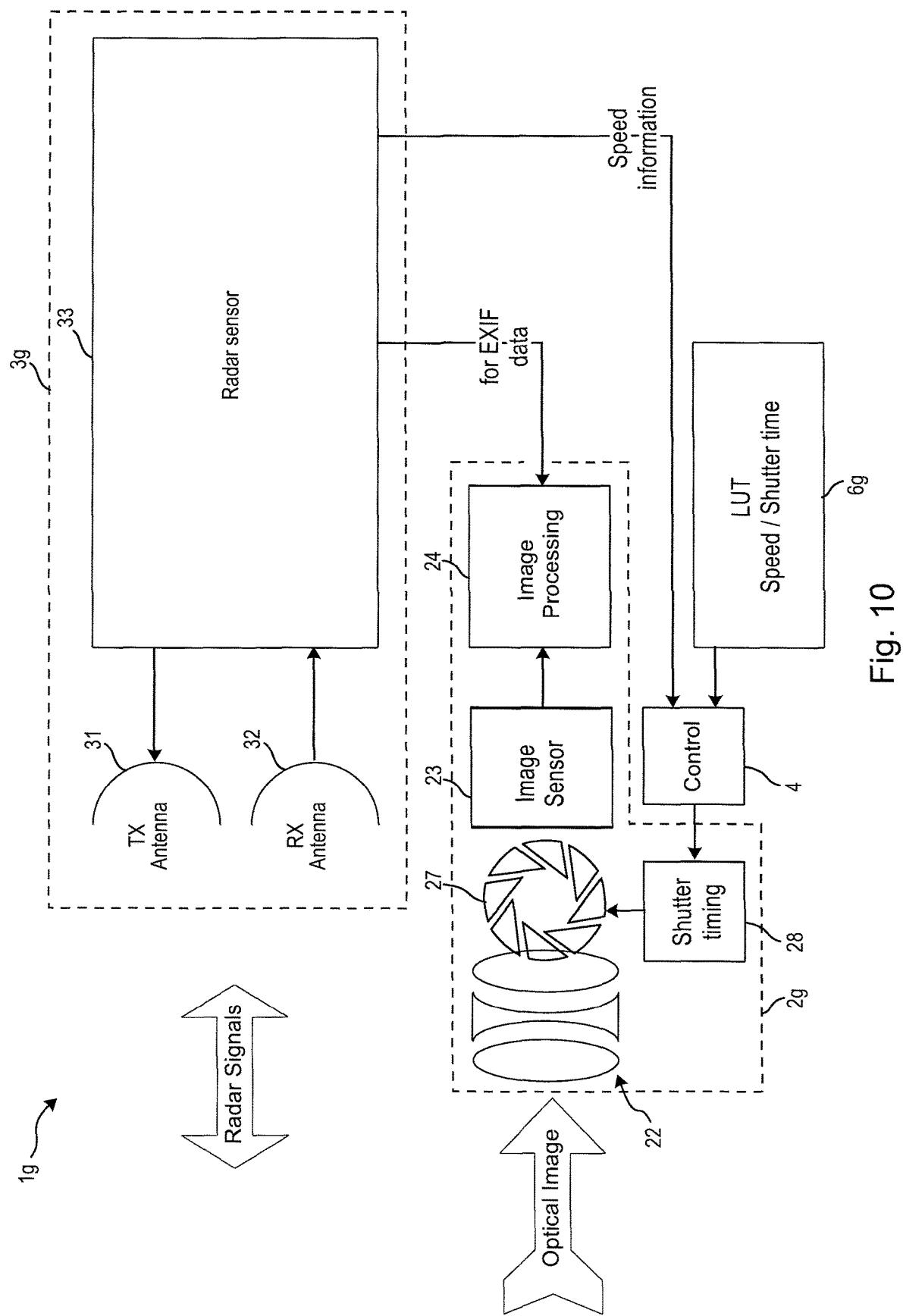
FIG. 10 shows a schematic diagram of a seventh embodiment of a camera according to the present disclosure.

FIG. 10 shows a schematic diagram of a corresponding seventh embodiment of a camera 1g according to the present disclosure. In this embodiment the optical system 1g comprises a shutter timing unit 28 for changing the shutter timing of said optical system 2g, in particular of the shutter 27. The control unit 4 controls the shutter timing unit 28 based on the speed information obtained by the radar system 3g. In particular, the control unit 4 looks up the shutter timing in an LUT stored in the memory 6g based on the speed of the target obtained from the radar system 3g.

Figure 11:
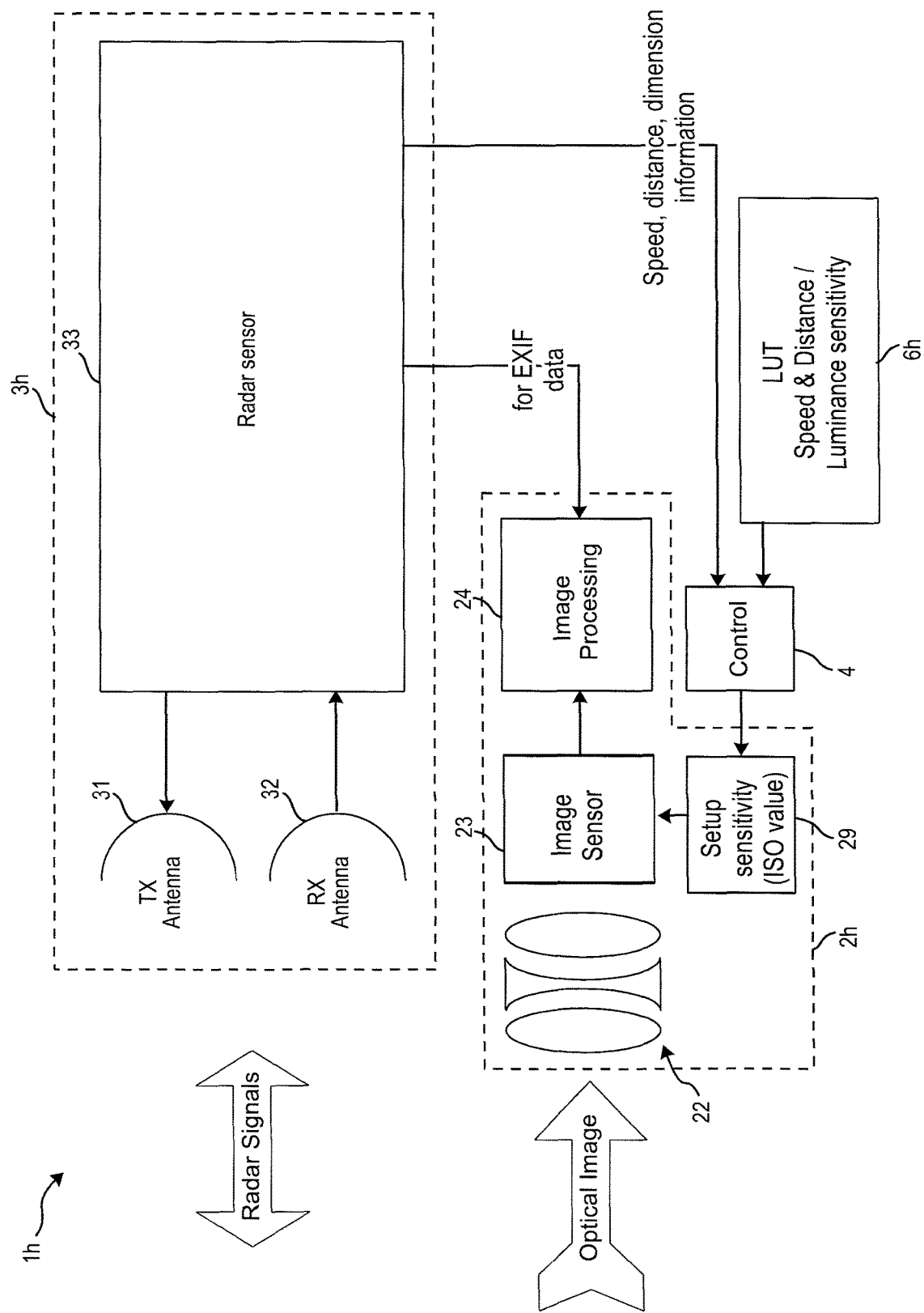
FIG. 11 shows a schematic diagram of a eighth embodiment of a camera according to the present disclosure.

As described above, speed, distances and dimensions of targets in the scene influence aperture and shutter timing. If aperture is quite close and shutter open time is short the image might suffer on luminance. Tuning the image sensor's ISO value or luminance sensitivity to a higher value will increase luminance sensitivity. A corresponding eighth embodiment of a camera 1h according to the present disclosure is depicted in FIG. 11. In this embodiment the optical system 1h comprises a luminance sensitivity control unit 29 configured to change the luminance sensitivity of said optical system 2h. The control unit 4 controls the luminance sensitivity control unit 29 based on the speed information, the distance information and/or the dimension information obtained by the radar system 3h. In particular, the control unit 4 looks up the luminance sensitivity in an LUT stored in the memory 6h based on the speed, distance and/or dimension information of the target obtained from the radar system 3h.

Figure 12:
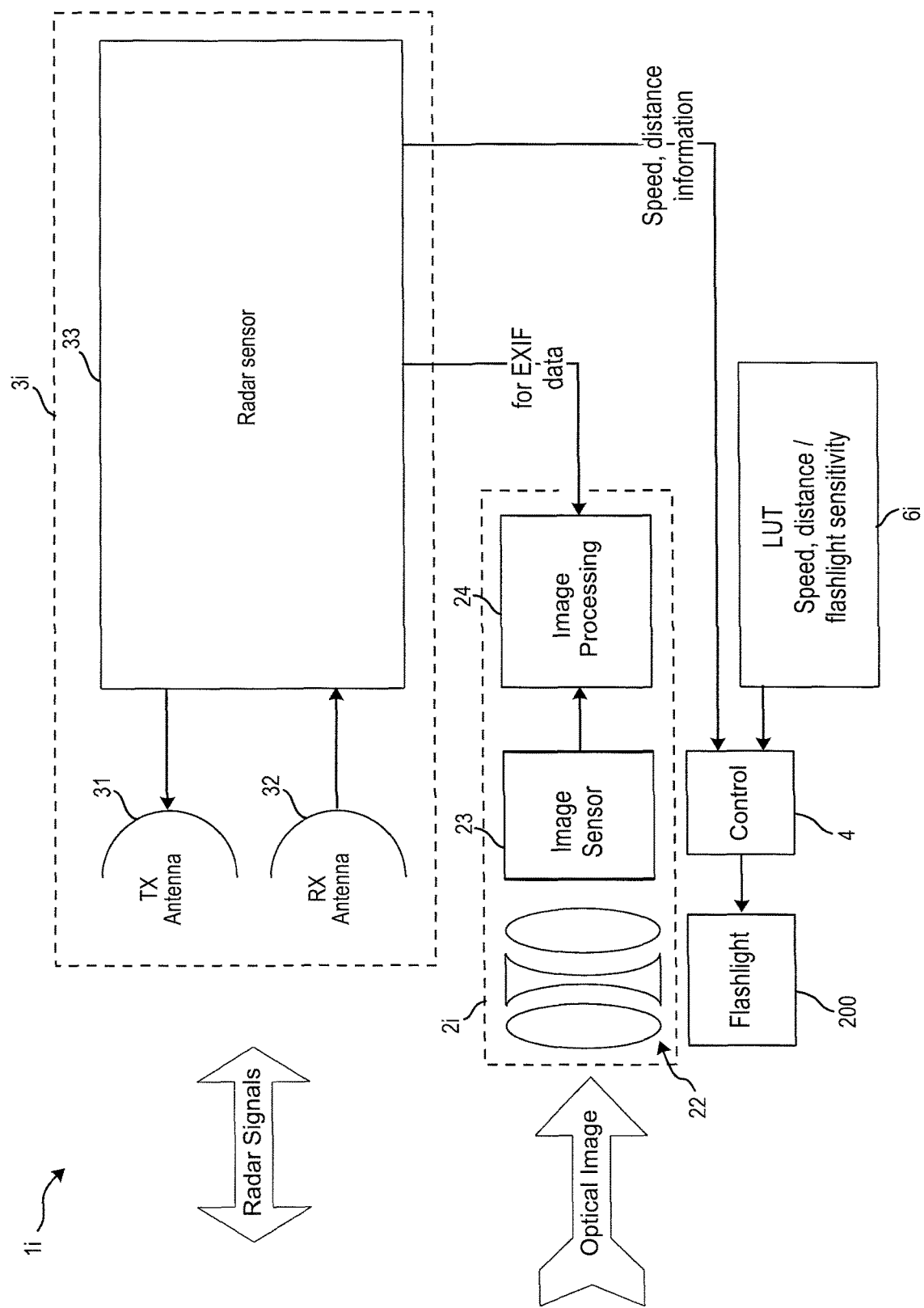
FIG. 12 shows a schematic diagram of a ninth embodiment of a camera according to the present disclosure.

In order to compensate insufficient luminance at the image sensor due to short shutter timing and small aperture setting the flashlight intensity might be adjusted according to the information derived by the radar system. A corresponding ninth embodiment of a camera 1i according to the present disclosure is depicted in FIG. 12. In this embodiment the optical system 1i comprises a flashlight unit 200 for illuminating the scene. The control unit 4 controls the flashlight intensity of the flashlight unit 200 based on the speed information, the distance information and/or the dimension information obtained by the radar system 3i.

In other embodiments the memory stores environment-related look-up tables at least for an environment of air and an environment under water. For instance, under water optical and electrical waves face different propagations and measured distances might no more be correct. If e.g. the submarine white balance feature at the camera was selected, a submarine LUT can be selected to fix the lens position used for focusing as described with reference to FIG. 6. Scuba divers might use their camera to measure the distance to the water surface.

Another advantage of the proposed radar based camera is that the focus function can be implemented without a light illuminating the scene before the image is taken. All conventional auto-focus algorithms have to illuminate the scene in advance to allow maximizing the sharpness in the image. The proposed radar based autofocus measures the distance to the object and adjusts the focus lens. This works fine in a dark scenery. It does not warn or prepare people being snapshotted before the image is taken.

Using a radar autofocus the scene might be interpreted automatically before taking the image. The focus might be adjusted on targets or objects being most interested in the scene. The most interested target might be the target with the largest radar cross section (RCS), or the target having the highest movement (fastest target) or any other combination of RCS and the speed as described above.

Figure 13:
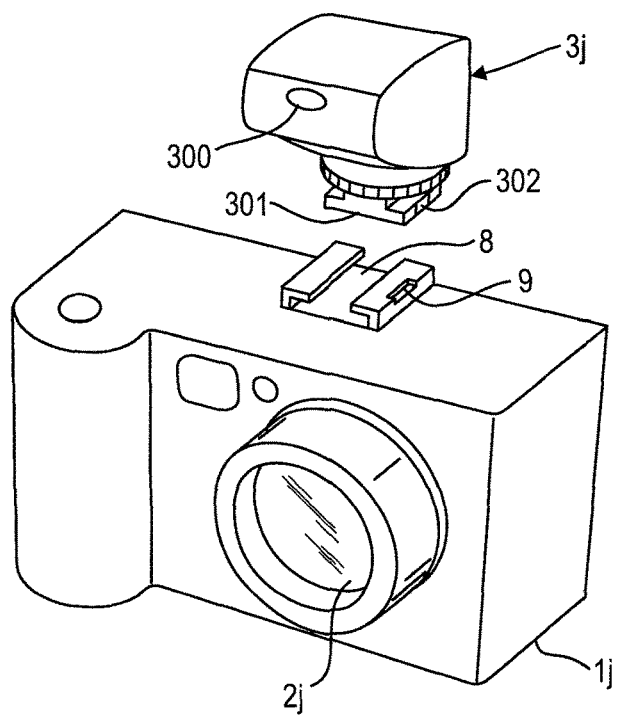
FIG. 13 shows a schematic diagram of a camera having a hot shoe for mounting a removable radar system.

Another embodiment of a camera 1j and a radar system 3j is shown in FIG. 13. The camera 1j comprises, besides the optical system 2j and the control unit 4, a hot shoe 8 at the outer surface of the camera's housing 9. This hot shoe 8 might be similar or identical to the hot shoe as conventionally used for mounting a flashlight, but may also be an additional and differently designed hot shoe.

The radar system 3*j* is configured as removable, add-on device comprising a radar unit 300 for obtaining radar information of targets within the radar field of view as explained above. The radar system 3*j* further comprises a hot shoe interface 301 configured to mount the radar system to the hot shoe 8 of the camera 1*j* and to dismount the radar system 3*j* from the hot shoe 8 of the camera 1*j*. Further, radar system 3*j* comprises a radar interface 302 enabling communication between the radar system 3*j* and the camera 1*j*, which preferably comprises a corresponding camera interface 9. These interfaces might be wireless (e.g. WiFi, Bluetooth, etc.) or via any electrical contacts provided within the hot shoe.

In an embodiment the radar information is forwarded to an external device, such as a smartphone, computer, tablet or wearable, that is linked with the camera or radar system. The external device might launch additional applications, e.g. launch an automatic phone call or GPS record, whenever a predetermined information is detected, e.g. whenever a speed threshold is passed by a target in the scene.

Preferably, the radar system is equipped with a MIMO or phased array antenna also recording the direction of arrival (x- and y-azimuth) of the reflected radar signals. One out of multiple targets might be identified by e.g. a moving target tracking algorithm. The camera moves the focus-lens in order to keep the selected target permanently sharp independent of any movements of the target. If the photographer releases the camera, the image is taken without any additional distance measurements or focusing. This speeds up the delay timings to snapshot images. Selection by the target might be done as described above (fastest target, largest RCS, etc.) or the user might select a target by touching the target's image on a user control screen (i.e. a user interface) of the camera.

Preferably, the camera might shoot a series of photos, whenever the target did a movement to another location. Conventional cameras record a series of images after a selected time interval, e.g. five images per second. A camera according to a preferred embodiment records series of images after the target moved a given distance. Hence, a series of equidistance movement images can be recorded. Also a new image might be released whenever a different speed was measured. The triggering speed might be the speed of the camera or the speed of any targets in the scene.

If multiple objects are identified by the radar system, an information like speed, distance, x- and y-azimuth of each object might be stored in the image's EXIF data.

Applications may be programmed on the camera utilizing the radar information. For instance, the absolute speed of an object can be calculated even if the target's direction is not directly towards the camera. This is explained with reference to the diagrams depicted in FIG. 14. FIG. 14A shows the relationship between the distances and angles, and FIG. 14B shows the relationship between the speeds and angles.

In a first step, the user measures the distance d1 of the camera 1 to the track T where the object is expected to appear soon. This distance d1 is recorded to a point which is passed by the object in normal (90° or right angle). This might be done by selecting the view with the track using the camera (incl. the radar) and touching the screen to select the location. Next, the user measures the distance d2 to the object 100. As shown in FIG. 14A, the angle $\cos(\alpha)=d1/d2$ gives the angle between the view to the track and the object. In a second step, the angle $\beta=90°-\alpha$ is calculated. As shown in FIG. 14B, the speed S1 of the object can be calculated in a third step as Speed_of_object_absolute=Speed_in_direction_of_radar/$\cos(\beta)$ (i.e. S1=S2/$\cos(\beta)$). The speed S2 in direction to the radar was measured by the radar system.

In the case of a radar system equipped with a phased array antenna, MIMO or beamforming capacity the angle $\alpha$ of the reflection might be detected using a 'Direction of Arrival' algorithm like Bartlett, MUSIC, ESPRIT, CAPON or others. If $\alpha$ was measured directly, $\beta$ might be calculated as described above without spotting the camera prior to the track. The speed of the object might also be calculated using $\alpha$ as follows: Speed_of_object_absolute=Speed_in_direction_of_radar/$\sin(\alpha)$ (i.e. S1=S2/$\sin(\alpha)$).

A radar function might be integrated into multiple cameras 401, 402, 403, 404 of a camera system 400 as schematically depicted in FIG. 15. The cameras could be located at individual views on the scene 410, e.g. at different angular positions with respect to a scene. The cameras might be synced e.g. via a wireless link to image and radar the scenery. Objects e.g. hidden by other objects might be identified. Speed, distances and azimuths into all directions might be recorded and stored in EXIF data of the image for each identified object. A three dimensional scene might be post-processed out of the images and radar information. Such scenery might be used to create landscapes or stories for a computer game or to create a computer aided design (CAD) drawing. For this, a processor 405 is preferably provided for processing image information and radar information obtained from said plurality of cameras to generate a three-dimensional data set of the scene.

The proposed camera including radar features is able to focus on human or metal objects, because human and metal objects provide a good RCS. To focus on objects like a soccer ball or tennis ball, such objects will be made of different materials, e.g. nano-structures are weaved into the textile of the ball.

The speed information measured by the radar system might be utilized to calculate the shutter open time. The shutter open time should be this short that no motion blur occurs on the image. Motion blur becomes visible if the movement of an object enhances the image resolution during the shutter open time.

Motion in direction towards the radar could be measured directly with the radar system. Motion in normal direction of the camera view might be measured with a switching beam or lobe switching radar system. A switching beam radar system sequentially looks for targets step by step in azimuth direction. The motion of a target is detected by comparing the location of the target from one scan to another scan. Of course the distance (also recorded by the radar) of the target has to be considered to derive the speed v in a normal direction of the camera view.

The distance of the various targets in the scene might be used to adjust the desired depth of focus, e.g. by adopting the aperture. E.g. if the user wants to have all targets in focus, the distance of all targets in the scenes is used to derive a maximum limit of the aperture (a large aperture might be preferable in bad light conditions). On the other hand, the user might want to isolate a target from the background (e.g. for a portrait) and the aperture might be adjusted based on the distance information for a desired depth of field.

The pixel pitch p is the distance between two adjacent pixels on the image sensor. The magnification factor of the objective m is the factor of the lateral size of any object in the scene divided by the size of its image on the image sensor where the motive appears. The relationship between the distance on the image sensor to the distance of the scene may be calculated with the commonly known intercept theorem. The intercept theorem, also known as Thales' theorem (not to be confused with another theorem with that name), is an important theorem in elementary geometry about the ratios of various line segments that are created if two intersecting lines are intercepted by a pair of parallels. It is equivalent to the theorem about ratios in similar triangles. More information can be found in many textbooks.

The shutter open time t may be calculated as: $t<p*m/v$, where v is the lateral speed component of the object in focus. The second parameter defining the shutter open time is the level of illumination at the image sensor. Whereas the speed information by the radar defines the maximal shutter open time, the level of illumination defines a minimal shutter open time. If both timings do not overlap, an optimal compromise can be found between an underexposed image and an image including motion blur. This compromise could be the mean timing out of both calculations. Alternatively, the optical aperture might be opened or the sensitivity of the image sensor might be shifted to a higher ISO level.

Sensing the illumination level might be done by the camera periodically when being in power up mode. This would reduce the shutter lag versus the measuring of the illuminations after manual releasing the shutter.

In summary, the proposed camera, camera system and radar system provide for various advantageous modes and applications. The disclosed ideas can generally be applied in many different kinds of cameras for various applications and in various scenarios. Apart from photo or video cameras, the disclosed ideas can be applied in surveillance or security cameras, cameras as use in game consoles (for monitoring the player's movements for interactive gaming), cameras for user monitoring e.g. for remotely controlling a device (e.g. a TV or machine) through gestures, etc.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed autofocus system may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A camera comprising:
an optical system configured to record images based on light entering the optical system from an optical field of view,
a radar system configured to obtain radar information of targets within a radar field of view that is overlapping with said optical field of view, said radar information including one or more of a distance information indicating the distance of targets with respect to the camera, a speed information indicating the speed of targets with respect to the camera and dimension information indicating a dimension of targets, and
a control unit configured to control at least one parameter of said optical system based on the obtained radar information.

2. The camera as defined in any preceding embodiment, wherein said control unit is configured to control one or more of the focus, the focal length, the optical aperture, the shutter timing, the luminance sensitivity, the frame rate and the flashlight intensity of said optical system based on the obtained radar information.

3. The camera as defined in any preceding embodiment, further comprising a memory storing one or more look-up tables, each providing a reference between values of at least one parameter of said radar information and values of at least one parameter of said optical system.

4. The camera as defined in any preceding embodiment, wherein said radar system is configured to obtain dimension information of targets indicating one or more of the size in one or more directions, the radar cross section, the shape and the material of targets from the intensity of radiation reflected from targets.

5. The camera as defined in embodiment 4, wherein said radar system is configured to additionally use image information obtained by said optical system to obtain dimension information of targets.

6. The camera as defined in any preceding embodiment, wherein said optical system comprises a focusing unit configured to focus said optical system on a target in the optical field of view, and
wherein said control unit is configured to control the focusing unit based on the distance information of said target obtained by the radar system.

7. The camera as defined in any preceding embodiment, wherein said optical system comprises a zoom unit configured to change the focal length of said optical system, and
wherein said control unit is configured to control the zoom unit based on the distance information and/or dimension information obtained by the radar system.

8. The camera as defined in any preceding embodiment, wherein said control unit is configured to control a camera manipulation unit for moving and/or tilting the camera with respect to a reference point based on the distance information and/or dimension information obtained by the radar system.

9. The camera as defined in embodiment 8, further comprising a camera manipulation unit for moving and/or tilting the camera with respect to a reference point.

10. The camera as defined in any preceding embodiment, wherein said optical system comprises an aperture change unit configured to change the optical aperture of said optical system, and
wherein said control unit is configured to control the aperture change unit based on the distance information and/or speed information obtained by the radar system.

11. The camera as defined in any preceding embodiment, wherein said optical system comprises a shutter timing unit configured to change the shutter timing of said optical system, and
wherein said control unit is configured to control the shutter timing unit based on the speed information obtained by the radar system.

12. The camera as defined in any preceding embodiment, wherein said optical system comprises a luminance sensitivity control unit configured to change the luminance sensitivity of said optical system, and
wherein said control unit is configured to control the luminance sensitivity control unit based on the speed information, the distance information and/or the dimension information obtained by the radar system.

13. The camera as defined in any preceding embodiment, further comprising a flashlight unit configured to illuminate the scene,
wherein said control unit is configured to control the flashlight intensity of the flashlight unit based on the speed information, the distance information and/or the dimension information obtained by the radar system.

14. The camera as defined in embodiment 3, wherein the camera comprises a calibration mode allowing a user to obtain information for filling and/or correcting references stored in one or more of said look-up tables.

15. The camera as defined in embodiment 3 or 14, wherein said memory stores environment-related look-up tables at least for an environment of air and an environment under water.

16. The camera as defined in any preceding embodiment, further comprising
a hot shoe configured to mount the radar system to the camera and to dismount the radar system from the camera and
a radar interface configured to enable communication between the radar system and the control unit.

17. The camera as defined in any preceding embodiment, wherein said control unit is configured to record a sequence of images, wherein an image is recorded if one or more targets moved at least a predetermined distance and/or at least at a predetermined speed.

18. The camera as defined in any preceding embodiment, further comprising a processing unit configured to calculate the speed of a target moving in a direction transverse to the direction away from the camera based on the radar information.

19. The camera as defined in any preceding embodiment, further comprising a communication interface configured to enable communication between the camera and an external device.

20. The camera as defined in any preceding embodiment, further comprising a user interface allowing a user to select a target to be imaged.

21. The camera as defined in any preceding embodiment, wherein said control unit is configured to control the focusing unit to focus said optical system on a target based on a selected distance and/or a selected speed.

22. The camera as defined in any preceding embodiment, further comprising a user interface allowing a user to select a range or value of distance and/or speed to be used by the control unit for controlling the focusing unit.

23. The camera as defined in any preceding embodiment, further comprising a user interface allowing a user to select a predetermined focusing mode according to which the control unit automatically controls the focusing unit to focus said optical system on a target having a predetermined distance and/or speed.

24. The camera as defined in any preceding embodiment, wherein said radar system is configured to have a radar field of view that substantially covers the optical field of view, in particular coincides with the optical field of view.

25. The camera as defined in any preceding embodiment, wherein said control unit is configured to select a target within the radar field of view based on a selected speed, to derive the distance of the selected target from the distance and speed information obtained by the radar system and to control the focusing unit to focus said optical system on a target within the optical field of view having the selected speed and the derived distance.

26. The camera as defined in any preceding embodiment, wherein said control unit is configured to select a target within the radar field of view based on a selected distance, to derive the speed of the selected target from the distance and speed information obtained by the radar system and to control the focusing unit to focus said optical system on a target within the optical field of view having the selected distance and the derived speed.

27. The camera as defined in any preceding embodiment, wherein said control unit is configured to control the focusing unit to focus said optical system on a target within the optical field of view having a speed above a selected speed threshold.

28. The camera as defined in any preceding embodiment, wherein said control unit is configured to control the focusing unit to focus said optical system on the fastest target within the optical field of view or on a target having a relative speed of substantially zero with respect to the camera.

29. The camera as defined in any preceding embodiment, wherein said control unit is configured to control the focusing unit to focus said optical system on a target within the optical field of view moving into a predetermined direction, in particular towards or away from the camera.

30. The camera as defined in any preceding embodiment, wherein the radar system is configured to obtain a Doppler-Range matrix of the radar field of view, said Doppler-Range matrix including the distance and speed information of the targets within the radar field of view.

31. The camera as defined in any preceding embodiment, wherein the optical system is configured to automatically record an image once it is controlled by the control unit to focus on a target based on a selected distance and/or a selected speed.

32. The camera as defined in any preceding embodiment, wherein the optical system is configured to record the speed, distance and/or position information of the target on which the optical system is focused or of all targets within the optical field of view along with a recorded image, in particular in exchangeable image file format data.

33. The camera as defined in any preceding embodiment, wherein the control unit is configured to control one or more parameters, in particular the observation time and/or resolution, of the radar system based on the distance of the targets within the radar field of view.

34. The camera as defined in any preceding embodiment, wherein the radar system is an OFDM radar system.

35. The camera as defined in embodiment 34, wherein the control unit is configured to control the observation time of the radar system based on the distance of the targets within the radar field of view by adapting the length and/or number of OFDM symbols transmitted by the radar system.

36. The camera as defined in embodiment 34, wherein the OFDM radar system is configured to embed data into the transmitted OFDM signals, wherein said data comprise identification data identifying the camera allowing the camera to identify if received radiation is received in response to radiation transmitted by its radar system or by radar systems of other cameras.

37. The camera as defined in embodiment 34, wherein the OFDM radar system is configured to embed data into the transmitted OFDM signals, wherein said data comprise synchronization data for synchronizing two or more cameras.

38. The camera as defined in embodiment 33, wherein the control unit is configured to shorten the observation time and/or the resolution of the radar system to radar targets at short distances and to expand the observation time and/or the resolution of the radar system to radar targets at long distances.

39. The camera as defined in any preceding embodiment, wherein said radar system is configured as MIMO radar system or phased array antenna system, in particular comprises at least two antennas for transmitting and for receiving signals.

40. The camera as defined in any preceding embodiment, wherein said radar system is configured to obtain angle information of one or more targets within the radar field of view.

41. A camera system comprising
a plurality of cameras as defined in any preceding embodiment located at different angular positions with respect to a scene,
a processor configured to process image information and radar information obtained from said plurality of cameras to generate a three-dimensional data set of the scene.

42. A radar system for use in a camera as defined in embodiment 16 comprising
a radar unit configured to obtain radar information of targets within a radar field of view, said radar information including one or more of a distance information indicating the distance of targets with respect to the radar system, a speed information indicating the speed of targets with respect to the radar system and dimension information indicating a dimension of targets,
a hot shoe interface configured to mount the radar system to a hot shoe of the camera and to dismount the radar system from the hot shoe of the camera and
a radar interface configured to enable communication between the radar system and the camera.

43. An autofocus system for a camera comprising:
a focusing unit configured to focus an optical system of the camera provided for recording images based on light entering the optical system from an optical field of view on a target in the optical field of view, and
a control unit configured to control the focusing unit to focus said optical system on a target based on a selected distance and/or a selected speed provided by a radar system of the camera provided for obtaining distance and speed information of targets within a radar field of view that is overlapping with said optical field of view, said distance and speed information indicating the distance and speed of targets with respect to the camera.

44. An autofocus control method for a camera comprising:
receiving distance and speed information of targets within a radar field of view that is overlapping with an optical field of view of an optical system of the camera provided for recording images based on light entering the optical system from an optical field of view on a target in the optical field of view, said distance and speed information being provided by a radar system of the camera provided for obtaining distance and speed information of targets within the radar field of view and indicating the distance and speed of targets with respect to the camera, and
controlling a focusing unit of the camera to focus said optical system on a target based on a selected distance and/or a selected speed selected from the receiving distance and speed information.

45. A non-transitory computer-readable recording medium that stores therein a computer program product, which, when executed by a processor, causes the method as defined in embodiment 44 to be performed.

46. A computer program comprising program code means for causing a computer to perform the steps of said method according to embodiment 44 when said computer program is carried out on a computer.

The invention claimed is:

1. A camera, comprising:
an optical system configured to record images based on light entering the optical system from an optical field of view;
a radar configured to obtain radar information of targets within a radar field of view that matches said optical field of view and, in response to a change in the optical field of view, is configured to change in size and orientation to match a size and orientation of the changed optical field of view, said radar information including one or more of distance information indicating a distance of the targets with respect to the camera, speed information indicating a speed of the targets with respect to the camera and dimension information indicating a dimension of the targets; and
a control circuit configured to
determine a fastest moving target within the radar field of view based on the radar information; and
control said optical system to perform an auto-focus operation on the determined fastest moving target based on the obtained radar information.

2. The camera as claimed in claim 1, wherein said control circuit is configured to control one or more of a focus, a focal length, an optical aperture, a shutter timing, a luminance sensitivity, a frame rate and a flashlight intensity of said optical system based on the radar information.

3. The camera as claimed in claim 1, further comprising:
a memory storing one or more look-up tables, each providing a reference between values of at least one parameter of said radar information and values of at least one parameter of said optical system.

4. The camera as claimed in claim 3, wherein the control circuit includes a calibration mode for allowing a user to obtain information for filling and/or correcting references stored in ore of said look-up tables.

5. The camera as claimed in claim 3, wherein said memory stores environment-related look-up tables at least for an environment of air and an environment under water.

6. The camera as claimed in claim 1, wherein said radar is an orthogonal frequency division multiplexing (OFDM) radar, and wherein said OFDM radar is configured to obtain the dimension information of the targets indicating a material of the targets from the intensity of radiation reflected from the targets.

7. The camera as claimed in claim 6, wherein said OFDM radar is configured to additionally use image information obtained by said optical system to obtain the dimension information of the targets.

8. The camera as claimed in claim 1, wherein
said optical system comprises a focus lens configured to focus said optical system on a target in the optical field of view, and
said control circuit is configured to control the focus lens based on the distance information of said target.

9. The camera as claimed in claim 1, wherein
said optical system comprises a zoom lens configured to change the focal length of said optical system, and
said control circuit is configured to control the zoom lens based on the distance information and/or the dimension information.

10. The camera as claimed in claim 1, wherein said control circuit is configured to control moving and/or tilting the camera with respect to a reference point based on the distance information and/or the dimension information.

11. The camera as claimed in claim 1, wherein
said optical system comprises an aperture trimmer configured to change the optical aperture of said optical system, and
said control circuit is configured to control the aperture trig mer based on the distance information and/or the speed information.

12. The camera as claimed in claim 1, wherein said control circuit is configured to control a shutter timing based on the speed information.

13. The camera as claimed in claim 1, wherein said control circuit is configured to control a change of a luminance sensitivity based on the speed information, the distance information and/or the dimension information.

14. The camera as claimed in claim 1, further comprising:
a light source configured to illuminate a scene, wherein said control circuit is configured to control an intensity of the light source based on the speed information, the distance information and/or the dimension information.

15. The camera as claimed in claim 1, further comprising:
a hot shoe configured to mount the radar to the camera and to dismount the radar system from the camera; and
a radar interface configured to enable communication between the radar and the control circuit.

16. The camera as claimed in claim 1, wherein
said control circuit is configured to record a sequence of images, and
an image is recorded if one or more of the targets moved at least a predetermined distance and/or at least at a predetermined speed.

17. The camera as claimed in claim 1, wherein the control circuit is configured to calculate a speed of a target moving in a direction transverse to a direction away from the camera based on the radar information.

18. A camera system, comprising:
a plurality of cameras as claimed in claim 1, each camera of the plurality of cameras located at different angular positions with respect to a scene; and
a processor configured to process image information and radar information obtained from said plurality of cameras to generate a three-dimensional data set of the scene.

19. A device, comprising:
a camera configured to capture images based on light entering the camera in an optical of view;
a radar configured to obtain radar information of an object within a radar field of view that matches the optical field of view and, in response to a change in the optical field of view, is configured to change in size and orientation to match a size and orientation of the changed optical field of view, the radar information including distance information indicating a distance of the object from the camera and motion information indicating a motion of the object with respect to the camera; and
a control circuit configured to
determine a fastest moving target within the radar angle of view based on the radar information; and
control said camera to perform an auto-focus operation on the determined fastest moving target based on the obtained radar information.

20. The device of claim 19, wherein
the size and orientation of the optical field of view is equal to the size and orientation of the radar field of view.

* * * * *